(12) United States Patent
Okada et al.

(10) Patent No.: US 11,194,021 B2
(45) Date of Patent: Dec. 7, 2021

(54) ELECTROMAGNETIC WAVE DETECTION APPARATUS, PROGRAM, AND ELECTROMAGNETIC WAVE DETECTION SYSTEM COMPRISING A CONTROLLER TO UPDATE RELATED INFORMATION ASSOCIATING AN EMISSION DIRECTION AND TWO ELEMENTS DEFINING TWO POINTS ON A PATH OF ELECTROMAGNETIC WAVES

(71) Applicant: KYOCERA Corporation, Kyoto (JP)

(72) Inventors: Hiroki Okada, Machida (JP); Eri Uchida, Yokohama (JP); Hiroyuki Minagawa, Yokohama (JP); Yoshiteru Takayama, Susono (JP); Mitsuo Ono, Mitaka (JP); Atsushi Hasebe, Yokohama (JP); Katsutoshi Kawai, Ichinomiya (JP); Yukitoshi Kanayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 270 days.

(21) Appl. No.: 16/603,145

(22) PCT Filed: Mar. 16, 2018

(86) PCT No.: PCT/JP2018/010613
§ 371 (c)(1),
(2) Date: Oct. 4, 2019

(87) PCT Pub. No.: WO2018/186153
PCT Pub. Date: Oct. 11, 2018

(65) Prior Publication Data
US 2020/0033116 A1   Jan. 30, 2020

(30) Foreign Application Priority Data

Apr. 6, 2017 (JP) .............................. JP2017-076224

(51) Int. Cl.
*G01S 17/89* (2020.01)
*G01S 7/481* (2006.01)
*G01B 11/22* (2006.01)

(52) U.S. Cl.
CPC ............ *G01S 7/4816* (2013.01); *G01B 11/22* (2013.01); *G01S 7/4817* (2013.01); *G01S 17/89* (2013.01)

(58) Field of Classification Search
CPC ........ G01S 17/89; G01S 7/4817; G01S 13/04; G01S 17/894; G01S 7/4865; G01B 11/22
(Continued)

(56) References Cited

U.S. PATENT DOCUMENTS

| 5,760,886 A | 6/1998 | Miyazaki et al. |
| 7,075,315 B2 * | 7/2006 | Tanaka .................. G01N 21/95 324/337 |

(Continued)

FOREIGN PATENT DOCUMENTS

| DE | 10 2005 049 471 A1 | 5/2007 |
| EP | 2957926 A1 | 12/2015 |

(Continued)

*Primary Examiner* — Que Tan Le
(74) *Attorney, Agent, or Firm* — Studebaker & Brackett PC

(57) ABSTRACT

An electromagnetic wave detection apparatus (10) includes an irradiator (11), a first detector (17), a propagation unit (20), a memory (13), and a controller (14). The irradiator (11) irradiates electromagnetic waves. The first detector (17) detects reflected waves of the electromagnetic waves irradiated onto an object (ob). The propagation unit (20) includes propagation elements (px). By irradiation position of the electromagnetic waves irradiated onto the object (ob), the propagation elements (px) switch between propagating and not propagating the reflected waves of the electromagnetic waves towards the first detector (17). The memory (13) stores related information. The controller (14) updates the (Continued)

related information based on the position of the propagation element (px) that is propagating the reflected waves toward the first detector (17) when the first detector (17) detects the reflected waves.

11 Claims, 27 Drawing Sheets

(58) Field of Classification Search
USPC .......................................... 250/221, 216, 235
See application file for complete search history.

(56) References Cited

U.S. PATENT DOCUMENTS

| 7,248,344 B2 | 7/2007 | Morcom |
| 9,689,667 B2 | 6/2017 | Royo Royo et al. |
| 2014/0049783 A1 | 2/2014 | Royo Royo et al. |

FOREIGN PATENT DOCUMENTS

| JP | H07-098381 A | 4/1995 |
| JP | 2004523769 A | 8/2004 |
| JP | 2010-96574 A | 4/2010 |
| JP | 2011-220732 A | 11/2011 |
| JP | 2014-512525 A | 5/2014 |

\* cited by examiner

FIG. 4

First related information

| Emission direction | Position of pixel |
|---|---|
| $(\theta_0, \phi_0)$ | $(x'_0, y'_0)$ |
| $(\theta_0, \phi_1)$ | $(x'_0, y'_1)$ |
| $(\theta_1, \phi_1)$ | $(x'_1, y'_1)$ |
| $(\theta_1, \phi_2)$ | $(x'_1, y'_2)$ |
| ⋮ | ⋮ |

FIG. 5

Second related information

| Emission direction | Irradiation position |
|---|---|
| $(\theta_0, \phi_0)$ | $(x''_0, y''_0)$ |
| $(\theta_0, \phi_1)$ | $(x''_0, y''_1)$ |
| $(\theta_1, \phi_1)$ | $(x''_1, y''_1)$ |
| $(\theta_1, \phi_2)$ | $(x''_1, y''_2)$ |
| ⋮ | ⋮ |

FIG. 6

Third related information

| Irradiation position | Position of pixel |
|---|---|
| $(x''_0, y''_0)$ | $(x'_0, y'_0)$ |
| $(x''_0, y''_1)$ | $(x'_0, y'_1)$ |
| $(x''_1, y''_1)$ | $(x'_1, y'_1)$ |
| $(x''_1, y''_2)$ | $(x'_1, y'_2)$ |
| ⋮ | ⋮ |

FIG. 7

Fourth related information

| Emission direction | Position of detection element |
|---|---|
| $(\theta_0, \phi_0)$ | $(x_0, y_0)$ |
| $(\theta_0, \phi_1)$ | $(x_0, y_1)$ |
| $(\theta_1, \phi_1)$ | $(x_1, y_1)$ |
| $(\theta_1, \phi_2)$ | $(x_1, y_2)$ |
| ⋮ | ⋮ |

FIG. 8

Fifth related information

| Position of pixel | Position of detection element |
|---|---|
| $(x'_0, y'_0)$ | $(x_0, y_0)$ |
| $(x'_0, y'_1)$ | $(x_0, y_1)$ |
| $(x'_1, y'_1)$ | $(x_1, y_1)$ |
| $(x'_1, y'_2)$ | $(x_1, y_2)$ |
| ⋮ | ⋮ |

FIG. 9

Sixth related information

| Irradiation position | Position of detection element |
|---|---|
| $(x''_0, y''_0)$ | $(x_0, y_0)$ |
| $(x''_0, y''_1)$ | $(x_0, y_1)$ |
| $(x''_1, y''_1)$ | $(x_1, y_1)$ |
| $(x''_1, y''_2)$ | $(x_1, y_2)$ |
| ⋮ | ⋮ |

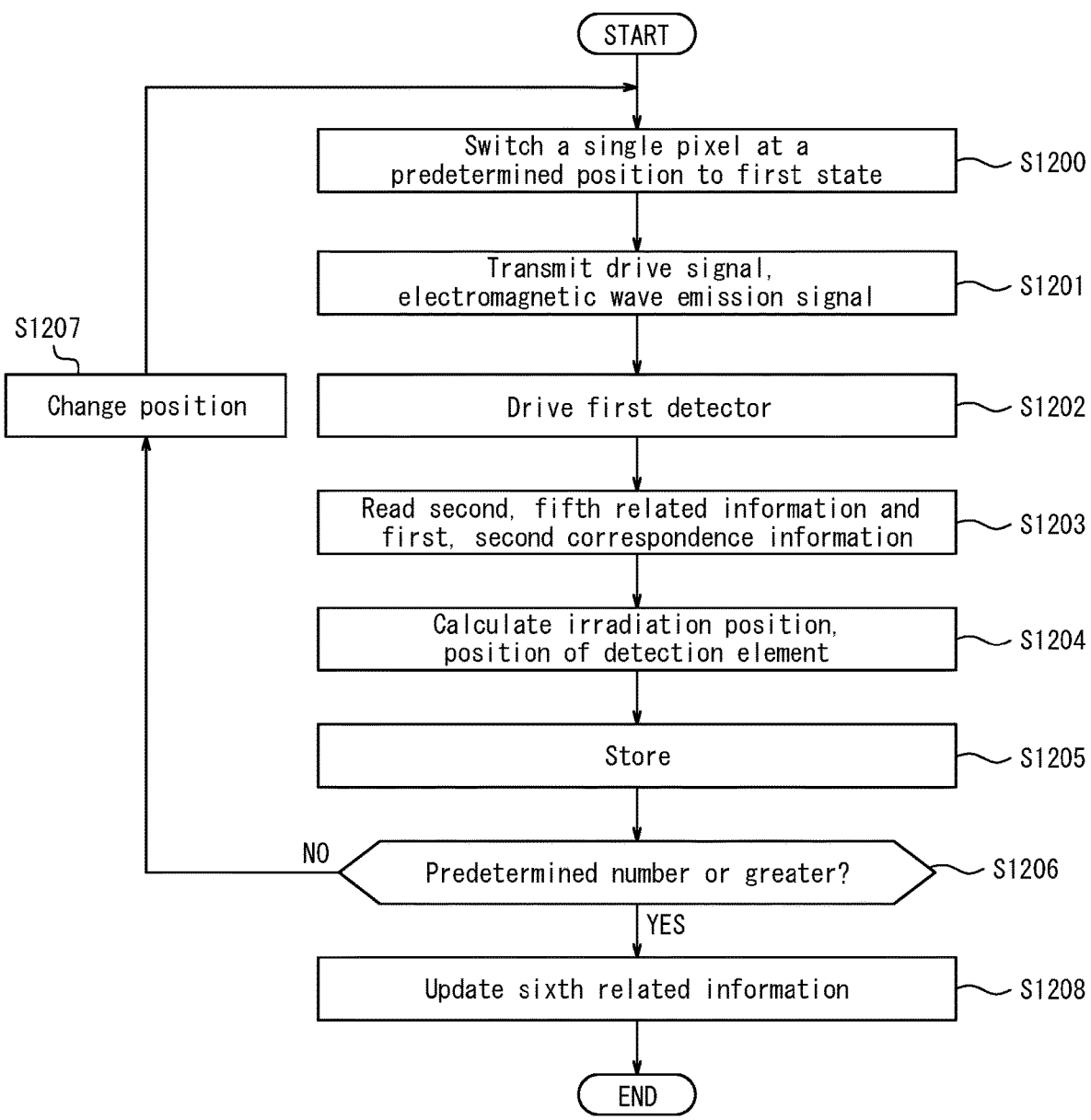

ELECTROMAGNETIC WAVE DETECTION APPARATUS, PROGRAM, AND ELECTROMAGNETIC WAVE DETECTION SYSTEM COMPRISING A CONTROLLER TO UPDATE RELATED INFORMATION ASSOCIATING AN EMISSION DIRECTION AND TWO ELEMENTS DEFINING TWO POINTS ON A PATH OF ELECTROMAGNETIC WAVES

CROSS-REFERENCE TO RELATED APPLICATION

The present application claims priority to and the benefit of Japanese Patent Application No. 2017-076224 filed Apr. 6, 2017, the entire contents of which are incorporated herein by reference.

TECHNICAL FIELD

The present disclosure relates to an electromagnetic wave detection apparatus, a program, and an electromagnetic wave detection system.

BACKGROUND

In recent years, apparatuses have been developed to acquire information related to the surroundings from the results of detecting reflected waves of emitted electromagnetic waves. For example, an apparatus that uses laser radar to measure the position of an object is known, as in patent literature (PTL) 1.

CITATION LIST

Patent Literature

PTL 1: JP2011-220732A

SUMMARY

An electromagnetic wave detection apparatus according to a first aspect includes:

an irradiator configured to emit electromagnetic waves;

a first detector configured to detect reflected waves of the electromagnetic waves irradiated onto an object;

a propagation unit including a plurality of propagation elements that, by irradiation position of the electromagnetic waves irradiated onto the object, switch between propagating and not propagating the reflected waves of the electromagnetic waves towards the first detector;

a memory configured to store related information associating any two of an emission direction of the electromagnetic waves from the irradiator and two elements defining two points on a path of the electromagnetic waves emitted from the irradiator to at least the propagation unit via the object; and a controller configured to update the related information based on a position of a propagation element that is propagating the reflected waves towards the first detector when the first detector detects the reflected waves.

An electromagnetic wave detection system according to a second aspect includes:

an irradiator configured to emit electromagnetic waves;

a first detector configured to detect reflected waves of the electromagnetic waves irradiated onto an object;

a propagation unit including a plurality of propagation elements that, by irradiation position of the electromagnetic waves irradiated onto the object, switch between propagating and not propagating the reflected waves of the electromagnetic waves towards the first detector;

a memory configured to store related information associating any two of an emission direction of the electromagnetic waves from the irradiator and two elements defining two points on a path of the electromagnetic waves emitted from the irradiator to at least the propagation unit via the object; and a controller configured to update the related information based on a position of a propagation element that is propagating the reflected waves towards the first detector when the first detector detects the reflected waves.

A program according to a third aspect is for causing an apparatus to execute steps including:

emitting electromagnetic waves from an irradiator;

detecting, using a first detector, reflected waves of the electromagnetic waves irradiated onto an object;

causing a portion of a plurality of propagation elements to propagate the reflected waves of the electromagnetic waves irradiated onto the object towards the first detector, the plurality of propagation elements being included in a propagation unit and configured to switch between propagating and not propagating the reflected waves of the electromagnetic waves towards the first detector by irradiation position of the electromagnetic waves;

storing related information associating any two of an emission direction of the electromagnetic waves from the irradiator and two elements defining two points on a path of the electromagnetic waves emitted from the irradiator to at least the propagation unit via the object; and updating the information related to the emission direction based on a position of a propagation element that is propagating the reflected waves towards the first detector when the first detector detects the reflected waves.

BRIEF DESCRIPTION OF THE DRAWINGS

In the accompanying drawings:

FIG. 4 illustrates an example of first related information stored in the memory of FIG. 1;

FIG. 5 illustrates an example of second related information stored in the memory of FIG. 1;

FIG. 6 illustrates an example of third related information stored in the memory of FIG. 1;

FIG. 7 illustrates an example of fourth related information stored in the memory of FIG. 1;

FIG. 8 illustrates an example of fifth related information stored in the memory of FIG. 1;

FIG. 9 illustrates an example of sixth related information stored in the memory of FIG. 1;

FIG. 27 is a flowchart illustrating processing, executed by the controller of FIG. 1, to update the sixth related information in the second embodiment.

DETAILED DESCRIPTION

Embodiments of an electromagnetic wave detection apparatus to which the present disclosure is applied are described below with reference to the drawings. When the emission direction of emitted electromagnetic waves is estimated from previously obtained information, the actual emission direction and the estimated emission direction may differ. Therefore, an electromagnetic wave detection apparatus to which the present disclosure is applied is configured to reduce the difference between the actual emission direction of electromagnetic waves and the estimated emission direction of electromagnetic waves.

Figure 1:
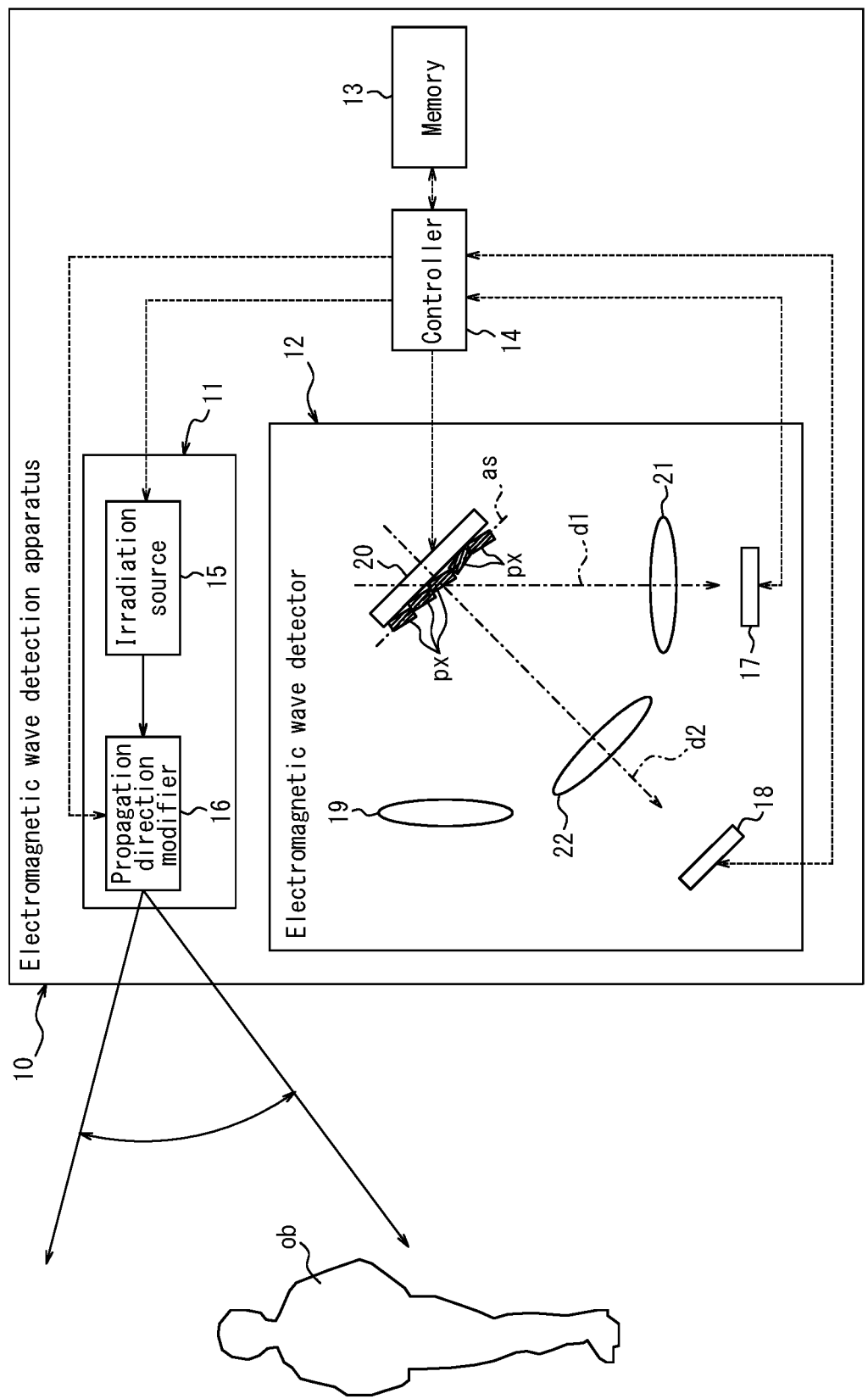
FIG. 1 is a configuration diagram schematically illustrating an electromagnetic wave detection apparatus according to a first embodiment.

As illustrated in FIG. 1, an electromagnetic wave detection apparatus 10 according to a first embodiment of the present disclosure includes an irradiator 11, an electromagnetic wave detector 12, a memory 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The irradiator 11 includes an irradiation source 15 that emits at least electromagnetic waves. The irradiation source 15 emits electromagnetic waves that, for example, are at least one of infrared rays, visible light rays, ultraviolet rays, and radio waves. In the first embodiment, the irradiation source 15 emits infrared rays.

The irradiation source 15 irradiates electromagnetic waves in a beam with a predetermined width. In the first embodiment, the irradiation source 15 emits a narrow beam, for example 0.5°, of electromagnetic waves. The irradiation source 15 can emit electromagnetic waves in pulses or continuously. In the first embodiment, the irradiation source 15 emits pulses of electromagnetic waves. For example, the irradiation source 15 includes a light emitting diode (LED), laser diode (LD), or the like. The irradiation source 15 switches between emitting and not emitting electromagnetic waves in response to control by the controller 14, described below.

In the irradiator 11, the emission direction of the electromagnetic waves may be fixed or may be variable in response to a control signal outputted from the controller 14. In the first embodiment, the emission direction of electromagnetic waves is variable.

The emission direction of electromagnetic waves may be changed by causing electromagnetic waves emitted from a single irradiation source 15 to be reflected by a reflecting surface with a variable inclination angle. The emission direction of electromagnetic waves may be changed as in phased array radar, for example, by emission of electromagnetic waves from a plurality of irradiation sources 15, disposed in an array on a flat surface, while the phase is shifted little by little. In the first embodiment, the emission direction of the electromagnetic waves is changed by reflection using a reflecting surface, as described below.

As described above, the irradiator 11 in the first embodiment further includes a propagation direction modifier 16. The propagation direction modifier 16 includes a reflecting surface capable of changing orientation. The propagation direction modifier 16 changes the orientation of the reflecting surface based on a drive signal outputted by the controller 14, described below.

In accordance with the drive signal, the reflecting surface changes the propagation direction of the electromagnetic waves emitted from the irradiation source 15, thereby irradiating an object ob while changing the irradiation position. In other words, the propagation direction modifier 16 scans the object ob with the electromagnetic waves emitted from the irradiation source 15. The propagation direction modifier 16 scans the object ob in one or two dimensions. In the first embodiment, the propagation direction modifier 16 scans the object ob in two dimensions.

The propagation direction modifier 16 is configured so that at least a portion of an irradiation region of the electromagnetic waves that are emitted by the irradiation source 15 and reflected is included in an electromagnetic wave detection range of the electromagnetic wave detection apparatus 10. Accordingly, at least a portion of the electromagnetic waves irradiated onto the object ob via the propagation direction modifier 16 can be detected by the electromagnetic wave detection apparatus 10.

In the first embodiment, the propagation direction modifier 16 is configured so that at least a portion of the irradiation region of the electromagnetic waves that are emitted by the irradiation source 15 and reflected by the propagation direction modifier 16 is included in the detection range of a second detector 18 and a first detector 17. Accordingly, at least a portion of the electromagnetic waves irradiated onto the object ob via the propagation direction modifier 16 can be detected by the first detector 17 and the second detector 18.

The propagation direction modifier 16 may, for example, include a micro electromechanical systems (MEMS) mirror, a polygon mirror, a galvano mirror, or the like. In the first embodiment, the propagation direction modifier 16 includes a MEMS mirror.

The electromagnetic wave detector 12 includes a pre-stage optical system 19, a propagation unit 20, a first post-stage optical system 21, a second post-stage optical system 22, the second detector 18, and the first detector 17.

The pre-stage optical system 19 includes either or both of a lens and a mirror, for example, and forms an image of the object ob that is located in the irradiation region of electromagnetic waves and becomes a subject of imaging.

It suffices for the propagation unit 20 to be provided at or near a primary image formation position, which is the position where the image of the object ob located at a predetermined position separate from the pre-stage optical system 19 is formed by the pre-stage optical system 19. In the first embodiment, the propagation unit 20 is provided at the primary image formation position.

The propagation unit 20 has an action surface "as" on which electromagnetic waves that pass through the pre-stage optical system 19 are incident. The action surface as is formed by a plurality of pixels (propagation elements) px aligned in a two-dimensional pattern. The action surface as is a surface that, in at least one of the first state and the second state described below, produces effects on the electromagnetic waves such as reflection and transmission.

By irradiation position of electromagnetic waves irradiated onto the object ob, the pixels px are capable of switching between propagating and not propagating reflected waves of the electromagnetic waves towards the second detector 18. Furthermore, the propagation unit 20 can switch each pixel px between a first state of propagating the electromagnetic waves incident on the action surface as in a first direction d1 and a second state of propagating the electromagnetic waves in a second direction d2. In the first embodiment, the first state is a first reflecting state of reflecting the electromagnetic waves incident on the action surface as in the first direction d1. The second state is a second reflecting state of reflecting the electromagnetic waves incident on the action surface as in the second direction d2.

In greater detail, the propagation unit 20 of the first embodiment includes a reflecting surface that reflects the electromagnetic waves on each pixel px. The propagation unit 20 switches each pixel px between the first state and the second state by changing the orientation of the reflecting surface of each pixel px.

In the first embodiment, the propagation unit 20 includes a digital micro mirror device (DMD), for example. The DMD can drive minute reflecting surfaces that configure the action surface as to switch the reflecting surface on each pixel px between inclined states of +12° and −12° relative to the action surface as. The action surface as is parallel to the board surface of a substrate on which the minute reflecting surfaces are mounted in the DMD.

Figure 2:
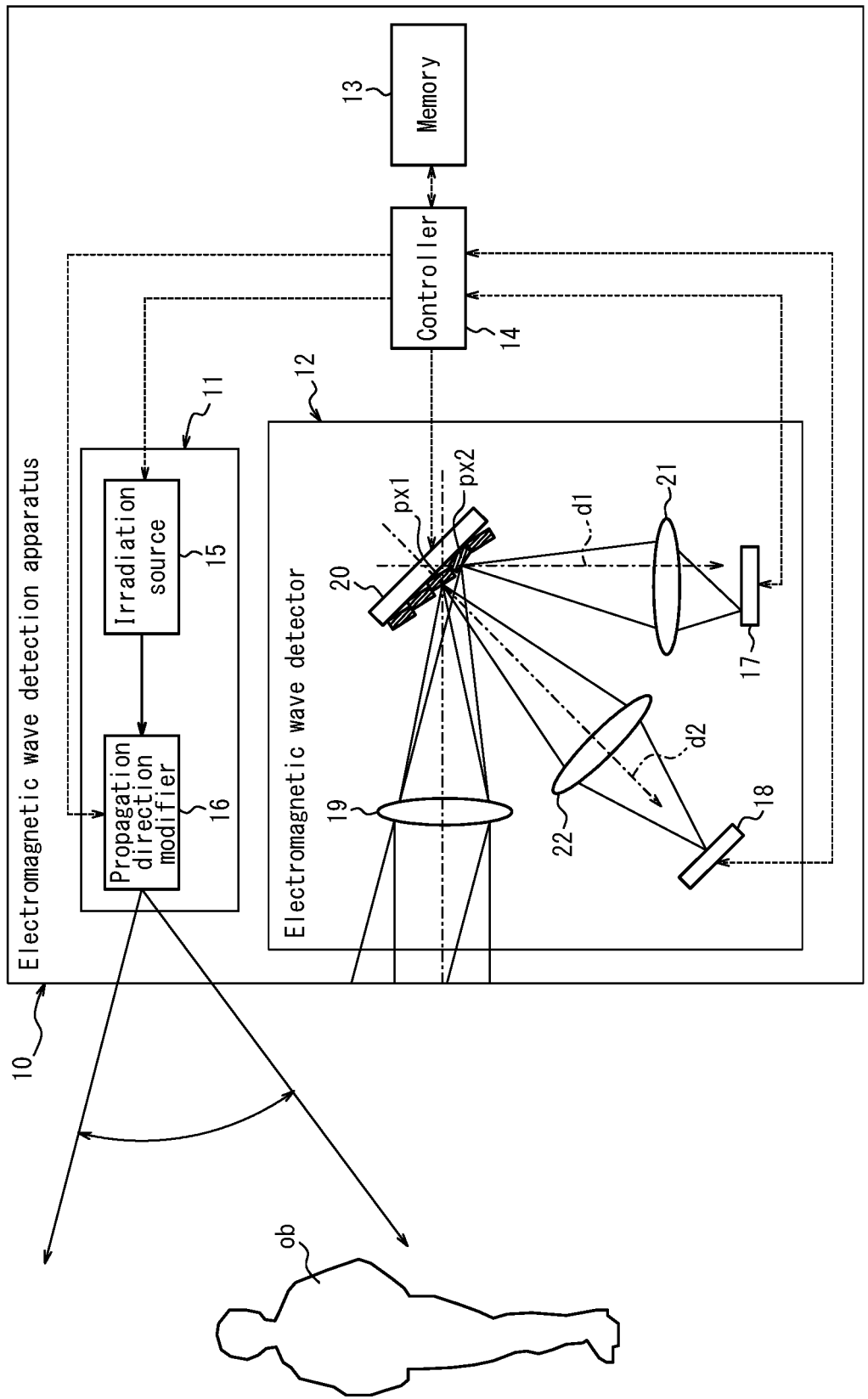
FIG. 2 is a configuration diagram of the electromagnetic wave detection apparatus to illustrate the propagation direction of electromagnetic waves in a first state and a second state of pixels in a propagation unit of the electromagnetic wave detection apparatus of FIG. 1.

The propagation unit 20 switches each pixel px between the first state and the second state in response to control by the controller 14, described below. For example, as illustrated in FIG. 2, the propagation unit 20 can simultaneously propagate electromagnetic waves incident on a portion of pixels px1 in the first direction d1 by switching the pixels px1 to the first state and propagate electromagnetic waves incident on another portion of pixels px2 in the second direction d2 by switching the pixels px2 to the second state. The propagation unit 20 can also propagate the electromagnetic waves incident on the same pixel px in the second direction d2 after the first direction d1 by switching the pixel px from the first state to the second state.

In the second state, each pixel px of the propagation unit 20 propagates the reflected waves of electromagnetic waves irradiated onto the object ob towards different detection elements of the second detector 18, described below, by irradiation position.

As illustrated in FIG. 1, the first post-stage optical system 21 is provided in the first direction d1 from the propagation unit 20. The first post-stage optical system 21 includes either or both of a lens and a mirror, for example. The first post-stage optical system 21 forms an image of the object ob represented by the electromagnetic waves whose propagation direction is switched at the propagation unit 20.

The second post-stage optical system 22 is provided in the second direction d2 from the propagation unit 20. The second post-stage optical system 22 includes either or both of a lens and a mirror, for example. The second post-stage optical system 22 forms an image of the object ob represented by the electromagnetic waves whose propagation direction is switched at the propagation unit 20.

The first detector 17 is provided along the path of electromagnetic waves that propagate through the first post-stage optical system 21 after propagating in the first direction d1 due to the propagation unit 20. The first detector 17 detects electromagnetic waves that pass through the first post-stage optical system 21, i.e. electromagnetic waves that propagate in the second direction d1.

In the first embodiment, the first detector 17 is an active sensor that detects reflected waves, from the object ob, of electromagnetic waves irradiated towards the object ob from the irradiator 11. The first detector 17 in the first embodiment detects reflected waves, from the object ob, of electromagnetic waves irradiated towards the object ob after being irradiated from the irradiator 11 and reflected by the propagation direction modifier 16.

In greater detail, the first detector 17 of the first embodiment includes a device configured as a ranging sensor. For example, the first detector 17 includes a single device such as an avalanche photodiode (APD), a photodiode (PD), or a ranging image sensor. The first detector 17 may include a device array, such as an APD array, a PD array, a ranging imaging array, or a ranging image sensor.

The first detector 17 detects reflected waves from a subject. In greater detail, the first detector 17 in the first embodiment detects electromagnetic waves in the infrared light band. Accordingly, the first detector 17 in the first embodiment cooperates with the propagation direction modifier 16 to form a scanning-type ranging sensor. The first detector 17 transmits detection information, indicating the detection of reflected waves, to the controller 14 as a signal.

It suffices for the single device configured as the above-described ranging sensor in the first detector 17 to be capable of detecting electromagnetic waves. Image formation at the detection surface is not required. The first detector 17 therefore need not be provided at a secondary image formation position, which is a position of image formation by the first post-stage optical system 21. In other words, as long as electromagnetic waves from all angles of view can be incident on the detection surface, the first detector 17 with this configuration may be disposed at any position along the path of electromagnetic waves that propagate in the second direction d1, due to the propagation unit 20, and subsequently pass through the first post-stage optical system 21.

The second detector 18 is provided along the path of electromagnetic waves that propagate through the second post-stage optical system 22 after propagating in the second direction d2 due to the propagation unit 20. The second detector 18 detects electromagnetic waves that pass through the second post-stage optical system 22, i.e. electromagnetic waves that propagate in the second direction d2.

The second detector 18 is a passive sensor that includes a plurality of detection elements. The detection elements are arranged in a plane perpendicular to the optical axis of the first post-stage optical system 21. In greater detail, the second detector 18 in the first embodiment includes a device array. For example, the second detector 18 includes an imaging device such as an image sensor or an imaging array, captures the image formed from electromagnetic waves at a detection surface, and generates image information corresponding to the imaged object ob. In greater detail, the second detector 18 in the first embodiment captures a visible light image. The second detector 18 transmits the generated image information to the controller 14 as a signal.

The second detector 18 detects the reflected waves of the electromagnetic waves irradiated onto the object ob from the irradiation source 15 via the propagation direction modifier 16, captures an image formed by the detected electromagnetic waves, and generates image information corresponding to the captured object ob. The detection elements detect the electromagnetic waves by irradiation position on the object ob.

The second detector 18 may capture an image other than a visible light image. The second detector 18 may include a thermo sensor. In this configuration, the electromagnetic wave detection apparatus 10 can acquire temperature information with the second detector 18.

In this way, the second detector 18 in the first embodiment includes a device array. Therefore, when an image is formed on the detection surface by incident electromagnetic waves, the image formed by the electromagnetic waves is incident on each detection element of the second detector 18, allowing an improvement in resolution. The second detector 18 is therefore preferably provided at a secondary image formation position, which is a position of image formation by the second post-stage optical system 22.

The memory 13 may be configured by a semiconductor memory, a magnetic memory, or the like. The memory 13 stores a variety of information, data, programs for causing the electromagnetic wave detection apparatus 10 to operate, and the like. The memory 13 also functions as a working memory.

For example, the memory 13 stores related information. The related information includes information associating any two of the emission direction of electromagnetic waves and elements defining two points on a path of electromagnetic waves emitted in the emission direction from the irradiator 11 to at least the propagation unit 20 via the object ob. When the electromagnetic wave detection apparatus 10 is configured to include the second detector 18, as in the first embodiment, the related information may associate any two of the emission direction of electromagnetic waves and elements defining two points on a path of electromagnetic waves emitted in the emission direction from the irradiator 11 to the second detector 18 via the object ob.

The emission direction of electromagnetic waves refers to a variety of elements that define the emission direction. In a configuration adopting the propagation direction modifier 16, as in the first embodiment, the emission direction may be the inclination angle of the reflecting surface relative to a reference surface. The inclination angle may refer to the inclination angle relative to one axis, or inclination angles relative to two axes. As described above, when a plurality of irradiation sources 15 disposed in an array on a flat surface emit electromagnetic waves while shifting the phase little by little, the first related information may be the position identifying the irradiation source 15, among the plurality of irradiation sources 15, that is emitting electromagnetic waves. As also described above, the first related information may be a direction vector in a space serving as a reference in the irradiator 11 when the emission direction is fixed.

Figure 3:
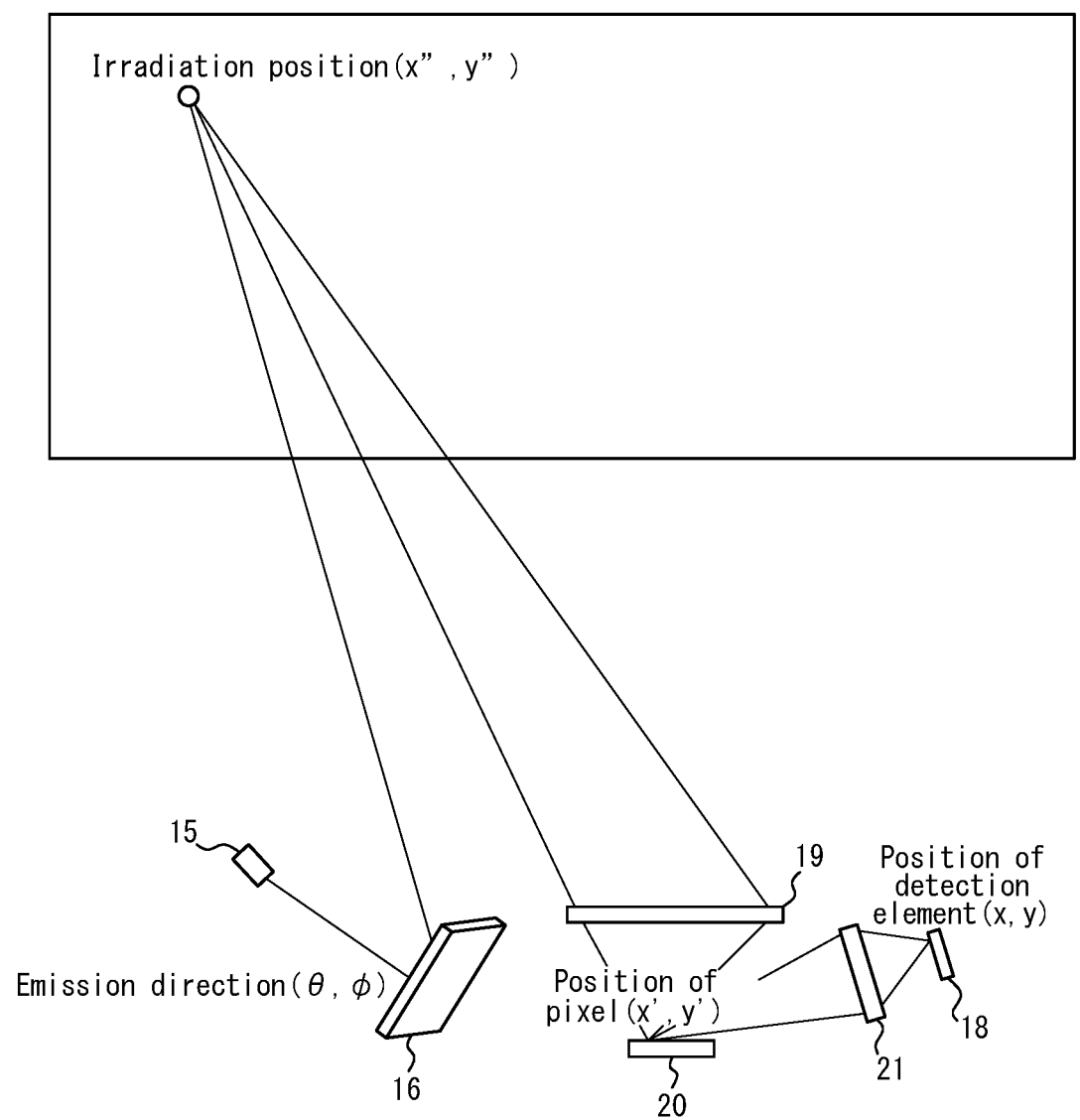
FIG. 3 is a conceptual diagram illustrating the positions, corresponding to an arbitrary emission direction, at each point along the path of emitted electromagnetic waves up to the first detector via an object in the electromagnetic wave detection apparatus of FIG. 1.

The points on a path of electromagnetic waves emitted in the emission direction from the irradiator 11 to at least the propagation unit 20 via the object ob are, for example, an irradiation position (x", y") within the irradiation region of electromagnetic waves, a position (x', y') of a pixel px on which reflected waves are incident in the propagation unit 20, and a position (x, y) of a detection element on which the reflected waves are incident in the first detector 17, these positions being determined for an arbitrary emission direction $(\theta, \phi)$, as in the example in FIG. 3. For example, the related information includes first related information through sixth related information.

The first related information is information associating an emission direction of electromagnetic waves and the position of the pixel px (propagation element) on which reflected waves of the electromagnetic waves emitted in the emission direction are incident. The first related information is, for example, the position of the pixel px as a function of the emission direction or the emission direction as a function of the position of the pixel px. The first related information may, for example, be the position (x', y') of the pixel px associated individually with each emission direction $(\theta, \phi)$, as illustrated in FIG. 4. The first related information may also be the emission direction associated individually with the position of each pixel px.

The second related information is information associating an emission direction of electromagnetic waves and the irradiation position within the irradiation region of the electromagnetic waves emitted in the emission direction. The second related information is, for example, the irradiation position as a function of the emission direction or the emission direction as a function of the irradiation position. The second related information may, for example, be the irradiation position (x", y") associated individually with each emission direction $(\theta, \phi)$, as illustrated in FIG. 5. The second related information may also be the emission direction associated individually with each irradiation position.

The third related information is information associating an irradiation position within the irradiation region of electromagnetic waves and the position of the pixel px (propagation element) on which reflected waves of the electromagnetic waves irradiated onto the irradiation position are incident. The third related information is, for example, the position of the pixel px as a function of the irradiation position or the irradiation position as a function of the position of the pixel px. The third related information may, for example, be the position (x', y') of the pixel px associated individually with each irradiation position (x", y"), as illustrated in FIG. 6. The third related information may also be the irradiation position associated individually with the position of each pixel px.

The fourth related information is information associating an emission direction of electromagnetic waves and the position of the detection element that detects the reflected waves of the electromagnetic waves emitted in the emission direction. The fourth related information is, for example, the position of the detection element as a function of the emission direction or the emission direction as a function of the detection element. The fourth related information may, for example, be the position (x, y) of the detection element associated individually with each emission direction ($\theta$, $\phi$), as illustrated in FIG. 7. The fourth related information may also be the emission direction associated individually with the position of each detection element.

The fifth related information is information associating the position of the pixel px (propagation element) on which reflected waves of the electromagnetic waves are incident and the position of the detection element towards which the pixel px propagates the reflected waves. The fifth related information is, for example, the position of the detection element as a function of the position of the pixel px or the position of the pixel px as a function of the position of the detection element. The fifth related information may, for example, be the position (x, y) of the detection element associated individually with the position of each pixel px (x', y'), as illustrated in FIG. 8. The fifth related information may also be the position of the pixel px associated individually with the position of each detection element.

The sixth related information is information associating an irradiation position within the irradiation region of electromagnetic waves and the position of the detection element that detects the reflected waves of the electromagnetic waves irradiated onto the irradiation position. The sixth related information is, for example, the position of the detection element as a function of the irradiation position or the irradiation position as a function of the position of the detection element. The sixth related information may, for example, be the position (x, y) of the detection element associated individually with each irradiation position (x", y"), as illustrated in FIG. 9. The sixth related information may also be the irradiation position associated individually with the position of each detection element.

The memory 13 also stores first correspondence information indicating the correspondence between a drive signal and the emission direction of electromagnetic waves corresponding to the drive signal. The first correspondence information is, for example, the emission direction as a function of the drive signal, or the drive signal as a function of the emission direction. The first correspondence information may, for example, be the emission direction associated individually with each of a plurality of signal values of the drive signal. The first correspondence information may also be a plurality of signal values of the drive signal associated individually with each emission direction. As described above, in a configuration in which the emission direction of the electromagnetic waves is fixed, the memory 13 may directly store the emission direction of the electromagnetic waves instead of the first correspondence information.

The memory 13 also stores second correspondence information indicating the correspondence between the elapsed time from a reference time and the drive signal corresponding to the elapsed time. The second correspondence information is, for example, the drive signal as a function of the elapsed time, or the elapsed time as a function of the drive signal. The second correspondence information may also be a plurality of signal values of the drive signal associated individually with each elapsed time. The second correspondence information may also be the elapsed time associated individually with a plurality of signal values of the drive signal.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) that has one processor or a plurality of processors working together and a system-in-a-package (SiP).

The controller 14 acquires information related to the surroundings of the electromagnetic wave detection apparatus 10 based on electromagnetic waves detected by each of the first detector 17 and the second detector 18. The information related to the surroundings may, for example, be image information, distance information, and temperature information.

In the first embodiment, the controller 14 acquires image information in the form of electromagnetic waves detected as an image by the second detector 18, as described above. Based on the detection information detected by the first detector 17, the controller 14 in the first embodiment also uses the time-of-flight (TOF) method to acquire distance information of the irradiation position irradiated by the irradiator 11.

Figure 10:
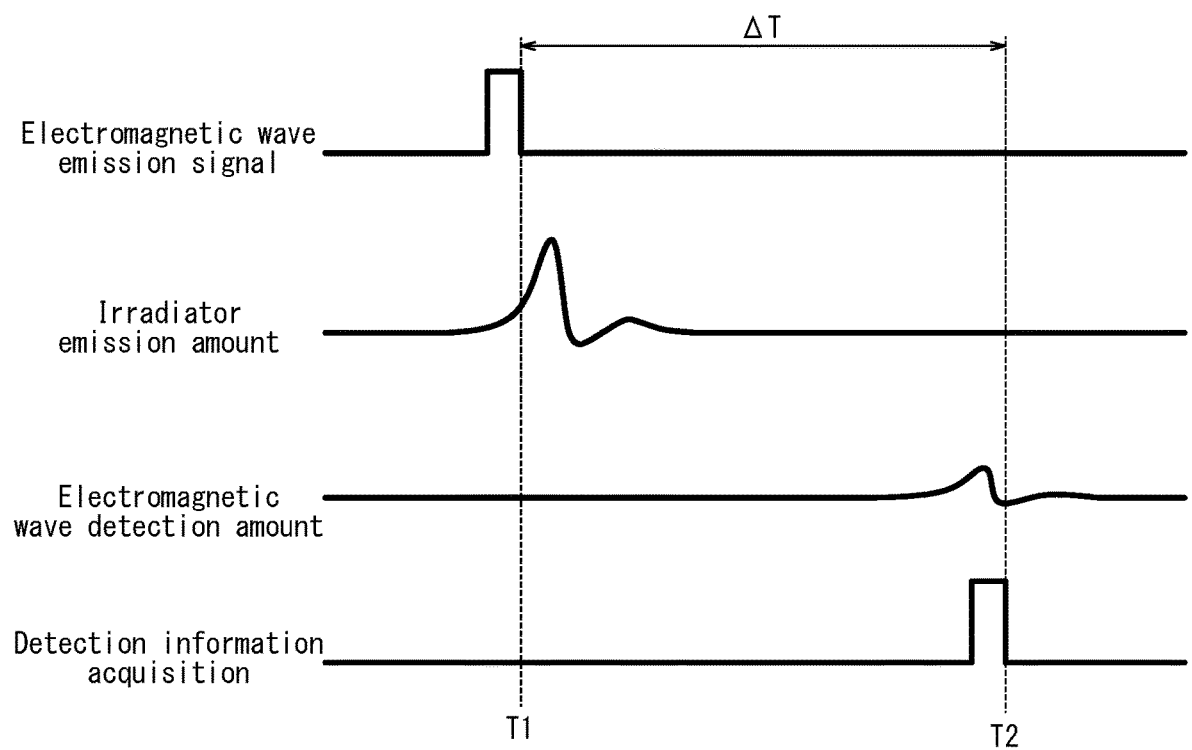
FIG. 10 is a timing chart of the timing of irradiation and detection of electromagnetic waves to illustrate the principle of ranging by a ranging sensor configured by an irradiator, a second detector, and a controller of FIG. 1.

As illustrated in FIG. 10, the controller 14 causes the irradiation source 15 to emit pulses of electromagnetic waves by inputting an electromagnetic wave emission signal to the irradiation source 15 (see the "electromagnetic wave emission signal" section). The irradiation source 15 irradiates electromagnetic waves based on the inputted electromagnetic wave emission signal (see the "irradiator emission amount" section). The electromagnetic waves emitted by the irradiation source 15 and reflected by the propagation direction modifier 16 to be irradiated onto an arbitrary irradiation region are reflected in the irradiation region.

The controller 14 may, for example, include a time measurement large scale integrated circuit (LSI) and measure a time $\Delta T$ from a timing T1 at which the controller 14 caused the irradiation source 15 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position.

The controller 14 outputs the drive signal to the propagation direction modifier 16. The controller 14 also reads the second related information and the first correspondence information from the memory 13. The controller 14 calculates the irradiation position based on an outputted drive signal, the first correspondence information, and the second related information. By calculating the distance to the irradiation position while changing the irradiation position using the drive signal, the controller 14 creates distance information in the image information acquired from the second detector 18.

In the first embodiment, the electromagnetic wave detection apparatus 10 is configured to create distance information by direct ToF, in which the time is directly measured from when laser light is irradiated until the laser light returns. The electromagnetic wave detection apparatus 10 is not, however, limited to this configuration. For example, the electromagnetic wave detection apparatus 10 may create distance information by flash ToF, in which electromagnetic waves are irradiated with a constant period, and the time until return is measured indirectly from the phase difference between the irradiated electromagnetic waves and the returning electromagnetic waves. The electromagnetic wave detection apparatus 10 may also create distance information by another ToF method, such as phased ToF.

The controller 14 controls the irradiation source 15, the propagation direction modifier 16, the propagation unit 20, the first detector 17, and the second detector 18 to repeatedly acquire the image information and the distance information. The control of each portion to repeatedly acquire the image information and the distance information is described below with reference to the timing chart in FIG. 11.

Figure 11:
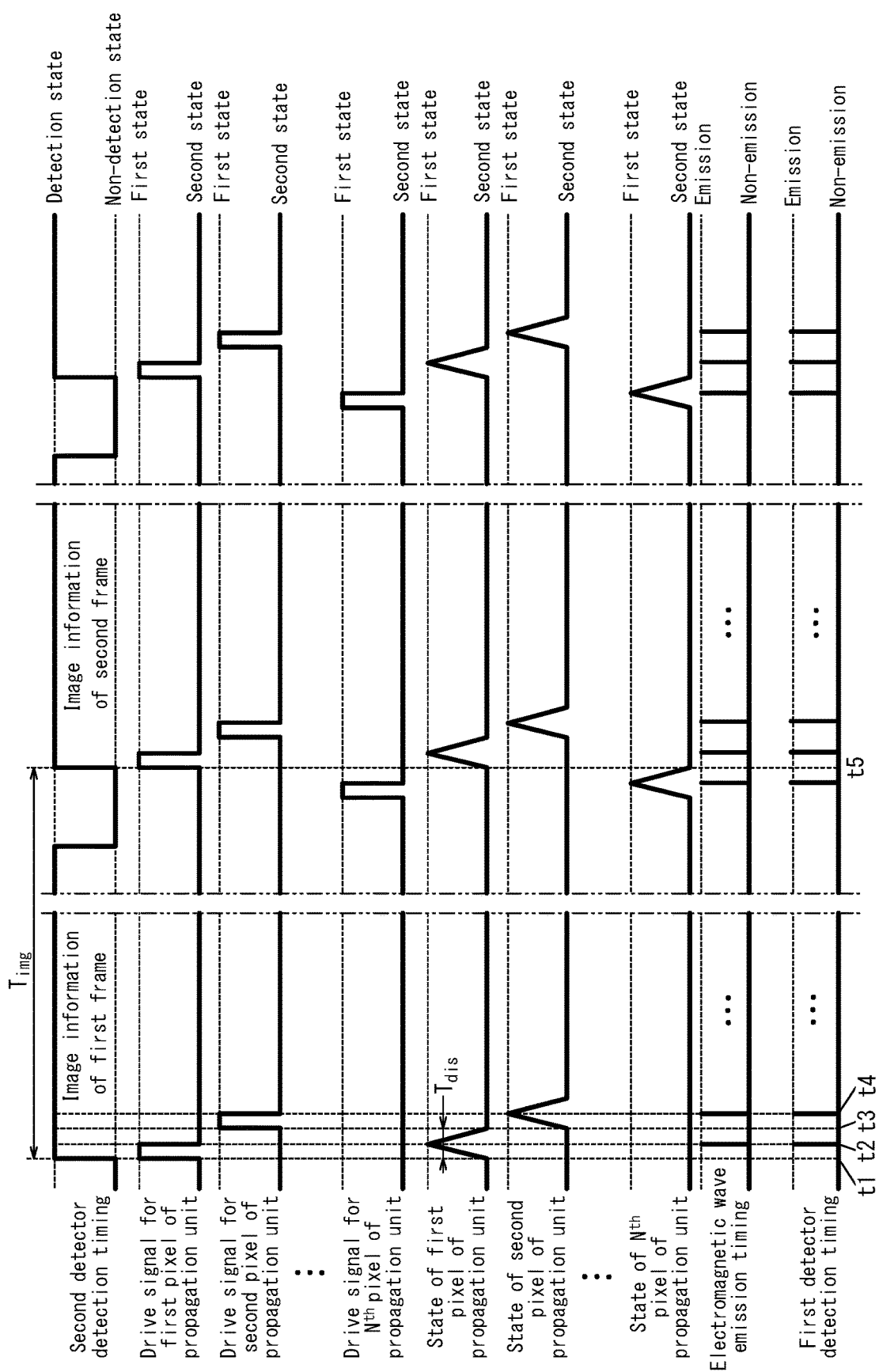
FIG. 11 is a timing chart to illustrate control of each portion for the controller of FIG. 1 to repeatedly acquire image information and distance information.
Figure 12:
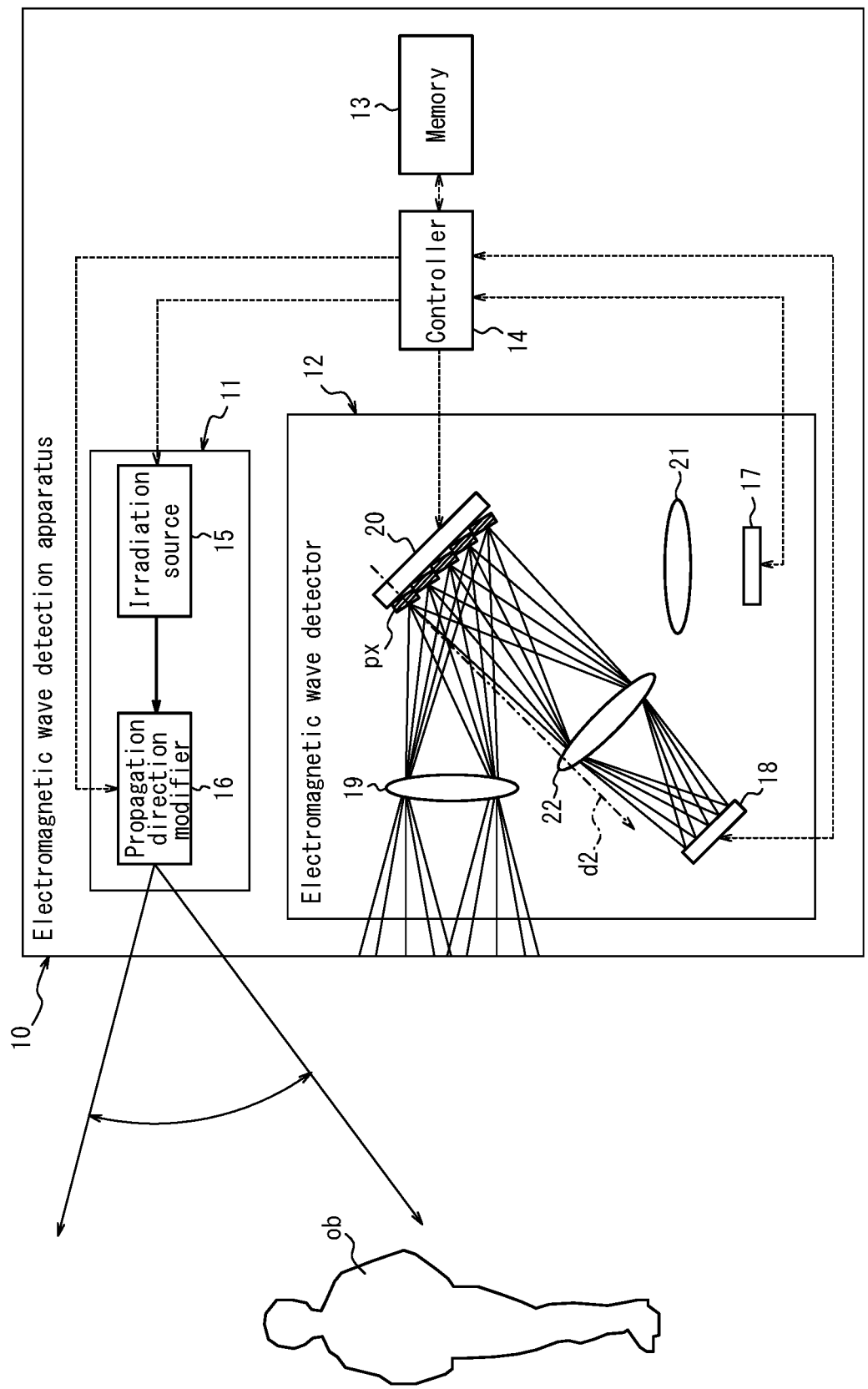
FIG. 12 is a configuration diagram of the electromagnetic wave detection apparatus to illustrate the propagation state of electromagnetic waves when an arbitrary pixel of the propagation unit of FIG. 1 is in the second state.

At timing t1, the controller 14 causes the second detector 18 to start detecting electromagnetic waves for generating image information of a first frame. At timing t1, all of the pixels px of the propagation unit 20 are in the second state, and the electromagnetic waves incident on the pre-stage optical system 19 reach the second detector 18 (see FIG. 12). At timing t1, the controller 14 also starts the switching of the first pixel px in the propagation unit 20 from the second state to the first state (see "drive signal for first pixel of propagation unit" section), as illustrated in FIG. 11. At timing t1, all of the other pixels px remain in the second state (see "state of second pixel of propagation unit", "state of $N^{th}$ pixel of propagation unit" sections).

Figure 13:
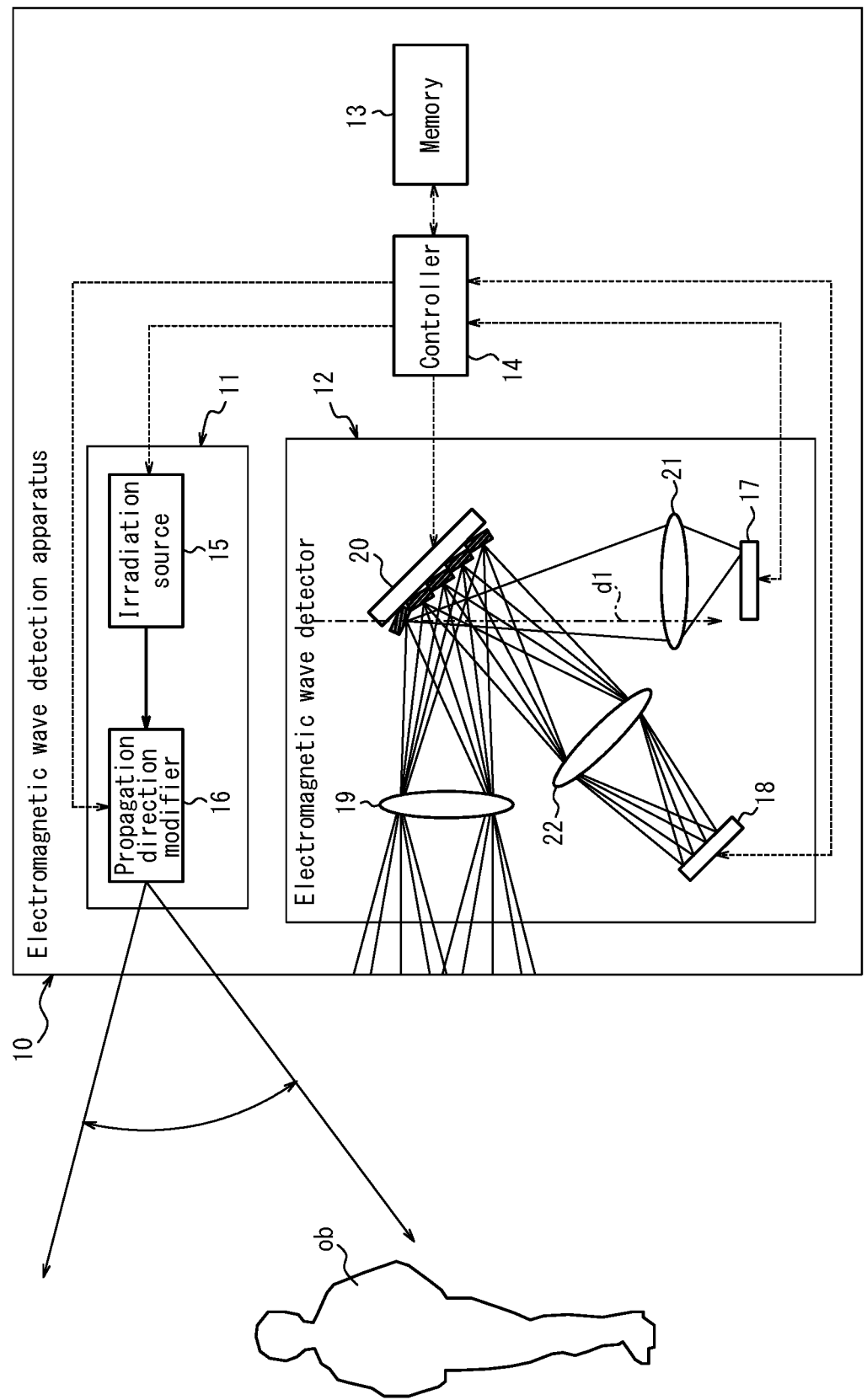
FIG. 13 is a configuration diagram of the electromagnetic wave detection apparatus to illustrate the propagation state of electromagnetic waves when only the arbitrary pixel of FIG. 12 is in the first state.

At timing t2, which is when switching of the first pixel px of the propagation unit 20 from the second state to the first state is complete (see "state of first pixel of propagation unit" section), the controller 14 causes the irradiation source 15 to emit electromagnetic waves (see "electromagnetic wave emission timing" section). At timing t2, the first pixel px of the propagation unit 20 switches from the second state (see FIG. 12) to the first state, and the electromagnetic waves that are incident on the pre-stage optical system 19 and form an image on the first pixel px of the propagation unit 20 propagate in the first direction d1 after the second direction d2 (see FIG. 13).

As illustrated in FIG. 11, the controller 14 causes the first detector 17 to detect electromagnetic waves at timing t2 (see "second detector detection timing" section). The time it takes from when the irradiation source 15 irradiates the electromagnetic waves until the electromagnetic waves reach the electromagnetic wave detection apparatus 10 is extremely short compared to the detection time for generating the image information and is, for example, on the order of nanoseconds. Therefore, detection of electromagnetic waves by the first detector 17 is complete in a negligible time and is considered to be the timing t2. The controller 14 acquires the distance information at the irradiation position corresponding to the first pixel px of the propagation unit 20 by calculation based on the drive signal transmitted to the propagation direction modifier 16 at timing t2.

Furthermore, at timing t2, the controller 14 starts the switching of the first pixel px in the propagation unit 20 from the first state to the second state (see "drive signal for first pixel of propagation unit" section). In this way, the controller 14 switches the first pixel px in the propagation unit 20 from the first state to the second state and can thereby cause the detection element in the second detector 18 corresponding to the first pixel px to detect the electromagnetic waves (visible light) again.

At timing t3, which is when switching of the first pixel px of the propagation unit 20 from the first state to the second state is complete (see "state of first pixel of propagation unit" section), the controller 14 starts the switching of the second pixel px in the propagation unit 20 from the second state to the first state (see "drive signal for second pixel of propagation unit" section). At timing t3, all of the other pixels px remain in the second state (see "state of first pixel of propagation unit", "state of $N^{th}$ pixel of propagation unit" sections).

At timing t4, which is when switching of the second pixel px of the propagation unit 20 from the second state to the first state is complete (see "state of second pixel of propagation unit" section), the controller 14 causes the irradiation source 15 to emit electromagnetic waves (see "electromagnetic wave emission timing" section). At timing t4, the second pixel px of the propagation unit 20 switches from the second state to the first state, and the electromagnetic waves that are incident on the pre-stage optical system 19 and form an image on the second pixel px of the propagation unit 20 propagate in the first direction d1 after the second direction d2. The controller 14 causes the first detector 17 to detect electromagnetic waves at timing t4 (see "second detector detection timing" section). The controller 14 acquires the distance information at the irradiation position corresponding to the second pixel px of the propagation unit 20 by calculation based on the drive signal transmitted to the propagation direction modifier 16 at timing t4.

Furthermore, at timing t4, the controller 14 starts the switching of the second pixel px in the propagation unit 20 from the first state to the second state (see "drive signal for first pixel of propagation unit" section). In this way, the controller 14 switches the second pixel px in the propagation unit 20 from the first state to the second state and can thereby cause the detection element in the second detector 18 corresponding to the second pixel px to detect the electromagnetic waves (visible light) again.

The controller 14 subsequently switches the third pixel px to the $N^{th}$ pixel px in the propagation unit 20 in order, in the same way as the first pixel px, from the second state to the first state and from the first state to the second state. The controller 14 thereby acquires image information of the first frame along with distance information at the irradiation position corresponding to each pixel px.

As described above, the controller 14 is configured to perform control to start switching of the $M^{th}$ pixel px from the second state to the first state at the timing at which switching of the $(M-1)^{th}$ pixel px from the first state to the second state is complete. In this configuration, the propagation unit 20 can switch $T_{img}/T_{dis}$ pixels px from the second state to the first state in a time $T_{img}$ for generating one frame of image information.

In other words, the controller 14 can generate distance information for $T_{img}/T_{dis}$ pixels px in the time $T_{img}$. M is an integer satisfying $2 \leq M \leq N$. $T_{dis}$ is the sum of the time required for switching a pixel px of the propagation unit 20 from the second state to the first state and the time required to return from the first state to the second state. In other words, $T_{dis}$ is the time required to switch an arbitrary pixel px in order from the second state to the first state and back to the second state. In the first embodiment, $T_{img}$ is 1/60 s, for example, and $T_{dis}$ is 1/3000 s.

In a configuration in which the value of $T_{img}/T_{dis}$ is less than the number of pixels in the propagation unit 20, the controller 14 cannot switch all of the pixels px in the propagation unit 20 during the time $T_{img}$. Therefore, during the generation of one frame of image information, the controller 14 cannot generate distance information corresponding to the frame of image information. In other words, during the generation of one frame of image information, the controller 14 can only generate distance information corresponding to less than the frame of image information (for example, 0.5 frames).

To address this issue in a configuration in which the value of $T_{img}/T_{dis}$ is less than the number of pixels in the propagation unit 20, the controller 14 selects a smaller number of pixels px than $T_{img}/T_{dis}$ as targets of switching from among all of the pixels px in the propagation unit 20. Furthermore, the controller 14 transmits a drive signal to the propagation direction modifier 16 so that, at the timing of switching to the first state for each pixel px selected as a target of switching, electromagnetic waves are irradiated onto a region corresponding to the pixel px within the irradiation region.

In a configuration in which the value of $T_{img}/T_{dis}$ is less than the number of pixels in the propagation unit 20, the controller 14 may also perform control so that switching of all pixels px in the propagation unit 20 is complete during a time $P \times T_{img}$ for generating the image information of a plurality of frames (P frames, where P is a positive number satisfying P>1). Furthermore, the controller 14 transmits a drive signal to the propagation direction modifier 16 so that, at the timing of switching of each pixel px of the propagation unit 20, electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and collectively switch pixels px group by group. Furthermore, the controller 14 may transmit a drive signal to the propagation direction modifier 16 so that, at the timing of switching of a pixel px at a position representative of each group (for example, the central position of each group), electromagnetic waves are irradiated onto a region corresponding to the pixel px within the irradiation region.

In a configuration in which the value of $T_{img}/T_{dis}$ is less than the number of pixels in the propagation unit 20, the controller 14 may divide all of the pixels px in the propagation unit 20 into groups of $T_{img}/T_{dis}$ or fewer pixels px and switch only a certain pixel px in each group. Furthermore, the controller 14 may transmit a drive signal to the propagation direction modifier 16 so that, at the timing of switching of the certain pixel px, electromagnetic waves are irradiated onto a region corresponding to the pixel px within the irradiation region.

The detection element in the second detector 18 corresponding to a pixel px, of the propagation unit 20, switched to the first state during the capturing time of an image of one frame cannot receive light while the pixel px is in the first state. Therefore, the signal strength dependent on this detection element in the second detector 18 is reduced. The controller 14 may compensate for the reduced signal strength by multiplying the signal value of the detection element in the second detector 18 by a gain. The capturing time of an image of one frame corresponds to the time when the second detector 18 detects electromagnetic waves for generating one frame of image information.

In a configuration in which the scanning rate by the propagation direction modifier 16 is faster than the switching rate of a pixel px, i.e. when $T_{scn}$ is shorter than $T_{dis}$, the controller 14 may start switching of the $M^{th}$ pixel px from the second state to the first state before the timing at which switching of the $(M-1)^{th}$ pixel px from the second state to the first state is complete.

$T_{scn}$ is the time required for the irradiation position of electromagnetic waves emitted from the irradiation source 15 and reflected by the propagation direction modifier 16 to change from a certain irradiation position to the next irradiation position, or the time required to change from a certain irradiation position to an adjacent irradiation position. In this configuration, distance information can be generated at more pixels px in a shorter time than when another pixel px is switched to the first state only after switching of an arbitrary pixel px from the first state to the second state is complete.

The controller 14 starts detection of electromagnetic waves for generating image information of a second frame at t5, which is when the time $T_{img}$ required to generate image information of the first frame has elapsed from timing t1 (see "first detector detection timing" section). After detection of electromagnetic waves by the second detector 18 from timing t1 to t5 is finished, the controller 14 acquires the image information of the first frame based on the electromagnetic waves detected during that time. Subsequently, the controller 14 controls the irradiation source 15, the propagation direction modifier 16, the first detector 17, the second detector 18, and the propagation unit 20 to acquire the image information and the distance information in the same way as the control from timing t1 to t5.

The controller 14 updates the related information based on the position of the pixel px (propagation element), in the propagation unit 20, that propagates reflected waves towards the first detector 17. In the present embodiment, the controller 14 updates the related information by updating any of the first related information through the sixth related information. The related information to be updated can be selected from among the first related information through the sixth related information. The related information may be selected automatically or manually. In the present embodiment, for example, the operator can make a selection via an input device of the electromagnetic wave detection apparatus 10. Details on the updating of the related information are provided below.

Figure 14:
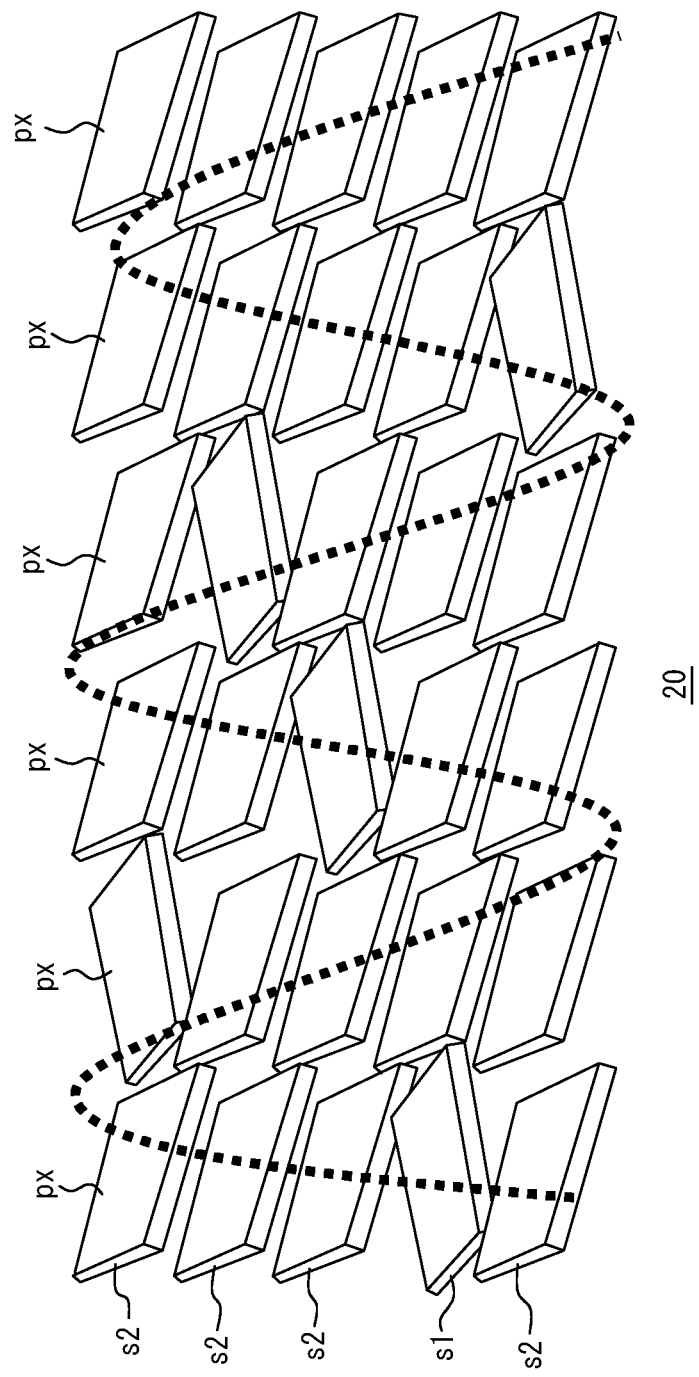
FIG. 14 is a schematic diagram of the propagation unit in the electromagnetic wave detection apparatus of the first embodiment, illustrating the state of pixels in the propagation unit and the scanning trajectory of reflected waves when the first related information is updated.

As illustrated in FIG. 14, to update the related information, the controller 14 switches pixels px at predetermined positions in the propagation unit 20 to the first state (see reference sign "s1") and switches the other pixels px to the second state (see reference sign "s2"). The propagation unit 20 is configured by 30 pixels px in 5 rows and 6 columns in FIG. 14 to simplify the drawing, but the number of pixels px is not limited to 30.

At least one pixel px at a predetermined position is sufficient when the first correspondence information is configured to be the emission direction as a function of the drive signal, or the drive signal as a function of the emission direction. A plurality of pixels px at predetermined positions is used when the first correspondence information is configured to be the emission direction associated individually with each of a plurality of signal values of the drive signal, or a plurality of signal values of the drive signal associated individually with each emission direction. As the number of pixels px at predetermined positions increases, the updating becomes more accurate. In a configuration with a plurality of pixels px at predetermined positions, the plurality of pixels px are preferably separated from each other. For example, the plurality of pixels px may be separated from each other at least by intervals of a predetermined number of pixels.

The controller 14 transmits a drive signal with a signal value corresponding to the elapsed time from a reference time to the propagation direction modifier 16 based on the second correspondence information read from the memory 13. The controller 14 transmits an electromagnetic wave emission signal to the irradiation source 15 continuously.

When the propagation direction modifier 16 inclines the reflecting surface in accordance with the drive signal whose signal value corresponds to the elapsed time, the emission direction changes in accordance with the elapsed time. For example, the pixels px of the propagation unit 20 are scanned by the reflected waves of the electromagnetic waves over a predetermined trajectory lo corresponding to the elapsed time. While the reflected waves of the electromagnetic waves are incident on the pixels px in the second state, the first detector 17 does not detect the electromagnetic waves. Conversely, when the reflected waves of the electromagnetic waves are incident on the pixels px in the first state, the first detector 17 detects the electromagnetic waves.

The controller 14 calculates the signal value of the drive signal corresponding to the pixel px, at a predetermined position, in the first state based on the first related information and the first correspondence information. Furthermore, the controller 14 calculates the elapsed time until the calculated signal value based on the second correspondence information.

The controller 14 observes the actual elapsed time, from the reference time, at which the first detector 17 detects the reflected waves. When the emission direction of electromagnetic waves estimated for the drive signal matches the actual emission direction, the estimated elapsed time matches the actual elapsed time at which the reflected waves are incident on the pixel px, at a predetermined position, in the first state.

Figure 15:
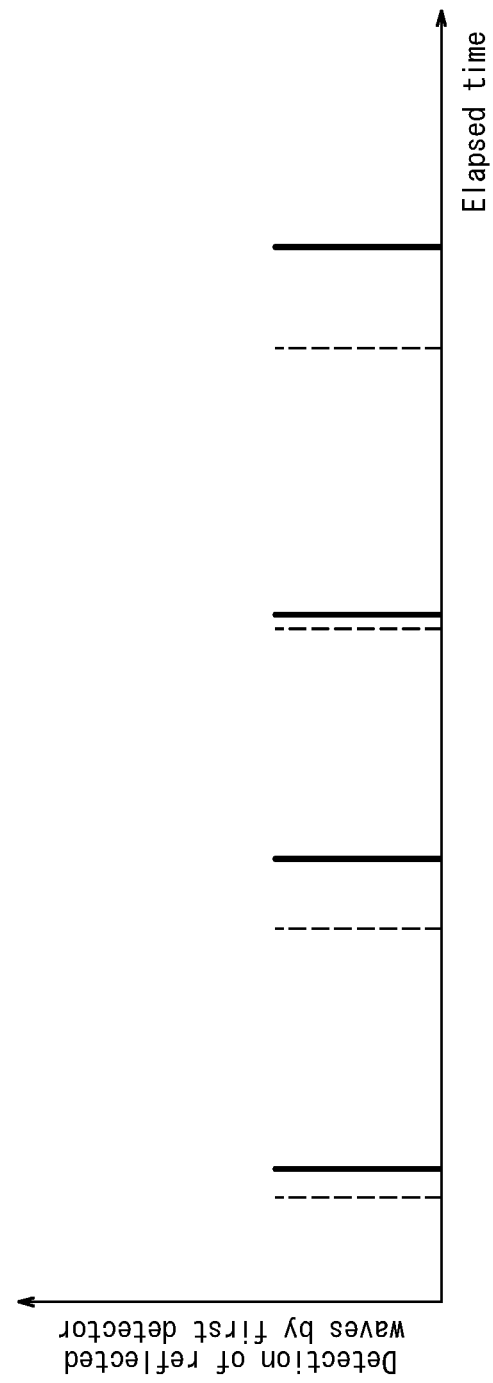
FIG. 15 is a graph of detection of reflected waves by the first detector versus elapsed time to illustrate the difference between the estimated elapsed time and the actual elapsed time at which the first detector detects reflected waves for a predetermined pixel when the first related information is updated in the electromagnetic wave detection apparatus of FIG. 1.

Conversely, when the estimated emission direction and the actual emission direction differ, a difference also occurs between the estimated elapsed time (see the dashed line) and the actual elapsed time (see the solid line), as illustrated in FIG. 15. The controller 14 combines the latest actual elapsed time with the estimated elapsed time for each pixel px at a predetermined position.

Based on the estimated elapsed time combined with the actual elapsed time, the controller 14 identifies the pixel px that is in the first state and on which the reflected light is incident at the actual elapsed time. Furthermore, the controller 14 uses the actual elapsed time to calculate, based on the second correspondence information, the drive signal at the time that the first detector 17 detects the reflected waves. The controller 14 also uses the calculated drive signal to calculate the emission direction of the electromagnetic waves based on the first correspondence information.

The control by the controller 14 to update the related information is the same up to this point for the first related information through the sixth related information. Subsequent control differs for each of the first related information through the sixth related information and is therefore described separately.

The controller 14 updates the first related information based on the calculated emission direction and the position of an identified pixel px.

For example, when the first related information is a function yielding the position of the pixel px as a function of the emission direction of electromagnetic waves, the controller 14 updates the function based on combinations. The controller 14 stores the updated function as the new relationship between the emission direction of electromagnetic waves and the position of the pixel px, i.e. as the new first related information, in the memory 13.

When, for example, the first related information is the position of the pixel px associated individually with each emission direction of electromagnetic waves, the controller 14 stores the position of the pixel px in each combination stored in the memory 13 as the position of the pixel px associated with the corresponding emission direction in the combination, i.e. as the new first related information, in the memory 13.

When, for example, the first related information is the emission direction associated individually with each position of the pixel px, the controller 14 stores the emission direction in each combination stored in the memory 13 as the new emission direction associated with the corresponding position of the pixel px in the combination, i.e. as the new first related information, in the memory 13.

To update the second related information, the controller 14 uses a predetermined position of an identified pixel px to calculate, based on the third related information, the irradiation position corresponding to the position of the pixel px. The controller 14 updates the second related information based on the calculated emission direction and irradiation position.

For example, when the second related information is a function yielding the irradiation position as a function of the emission direction of electromagnetic waves, the controller 14 updates the function based on combinations. The controller 14 stores the updated function as the new relationship between the emission direction of electromagnetic waves and the irradiation position, i.e. as the new second related information, in the memory 13.

When, for example, the second related information is the irradiation position associated individually with each emission direction of electromagnetic waves, the controller 14 stores the irradiation position in each combination stored in the memory 13 as the irradiation position associated with the corresponding emission direction in the combination, i.e. as the new second related information, in the memory 13.

When, for example, the second related information is the emission direction associated individually with each irradiation position, the controller 14 stores the emission direction in each combination stored in the memory 13 as the new emission direction associated with the corresponding irradiation position in the combination, i.e. as the new second related information, in the memory 13.

To update the third related information, the controller 14 uses the calculated emission direction to calculate the irradiation position of the electromagnetic waves based on the second related information. The controller 14 updates the third related information based on the calculated irradiation position and the position of an identified pixel px.

For example, when the third related information is a function yielding the position of the pixel px as a function of the irradiation position, the controller 14 updates the function based on combinations. The controller 14 stores the updated function as the new relationship between the irradiation position and the position of the pixel px, i.e. as the new third related information, in the memory 13.

When, for example, the third related information is the position of the pixel px associated individually with each irradiation position, the controller 14 stores the position of the pixel px in each combination stored in the memory 13 as the position of the pixel px associated with the corresponding irradiation position in the combination, i.e. as the new third related information, in the memory 13.

When, for example, the third related information is the irradiation position associated individually with each position of the pixel px, the controller 14 stores the irradiation position in each combination stored in the memory 13 as the new irradiation position associated with the corresponding position of the pixel px in the combination, i.e. as the new third related information, in the memory 13.

To update the fourth related information, the controller 14 uses a predetermined position of an identified pixel px to calculate, based on the fifth related information, the position of the detection element corresponding to the pixel px. The controller 14 updates the fourth related information based on the calculated emission direction and the calculated position of the detection element.

For example, when the fourth related information is a function yielding the position of the detection element as a function of the emission direction of electromagnetic waves, the controller 14 updates the function based on combinations. The controller 14 stores the updated function as the new relationship between the emission direction of electromagnetic waves and the position of the detection element, i.e. as the new fourth related information, in the memory 13.

When, for example, the fourth related information is the position of the detection element associated individually with each emission direction, the controller 14 stores the position of the detection element in each combination stored in the memory 13 as the position of the detection element associated with the corresponding emission direction in the combination, i.e. as the new fourth related information, in the memory 13.

When, for example, the fourth related information is the emission direction associated individually with each position of a detection element, the controller 14 stores the emission direction in each combination stored in the memory 13 as the new emission direction associated with the corresponding position of the detection element in the combination, i.e. as the new fourth related information, in the memory 13.

To update the fifth related information, the controller 14 uses the calculated emission direction to calculate, based on the fourth related information, the position of the detection element corresponding to the emission direction. The controller 14 updates the fifth related information based on the position of an identified pixel px and the calculated position of the detection element.

For example, when the fifth related information is a function yielding the position of the detection element as a function of the position of the pixel px, the controller 14 updates the function based on combinations. The controller 14 stores the updated function as the new relationship between the position of the pixel px and the position of the detection element, i.e. as the new fifth related information, in the memory 13.

When, for example, the fifth related information is the position of the detection element associated individually with each position of the pixel px, the controller 14 stores the position of the detection element in each combination stored in the memory 13 as the position of the detection element associated with the corresponding position of the pixel px in the combination, i.e. as the new fifth related information, in the memory 13.

When, for example, the fifth related information is the position of the pixel px associated individually with each position of the detection element, the controller 14 stores the position of the pixel px in each combination stored in the memory 13 as the new position of the pixel px associated with the corresponding position of the detection element in the combination, i.e. as the new fifth related information, in the memory 13.

To update the sixth related information, the controller 14 uses a predetermined position of an identified pixel px to calculate, based on the fifth related information, the position of the detection element corresponding to the pixel px. The controller 14 uses the calculated emission direction to calculate the irradiation position of the electromagnetic waves based on the second related information. The controller 14 updates the sixth related information based on the calculated irradiation position and the calculated position of the detection element.

For example, when the sixth related information is a function yielding the position of the detection element as a function of the irradiation position, the controller 14 updates the function based on combinations. The controller 14 stores the updated function as the new relationship between the irradiation position and the position of the detection element, i.e. as the new sixth related information, in the memory 13.

When, for example, the sixth related information is the position of the detection element associated individually with each irradiation position, the controller 14 stores the position of the detection element in each combination stored in the memory 13 as the position of the detection element associated with the corresponding irradiation position in the combination, i.e. as the new sixth related information, in the memory 13.

When, for example, the sixth related information is the irradiation position associated individually with each position of the detection element, the controller 14 stores the irradiation position in each combination stored in the memory 13 as the new irradiation position associated with the corresponding position of the detection element in the combination, i.e. as the new sixth related information, in the memory 13.

Figure 16:
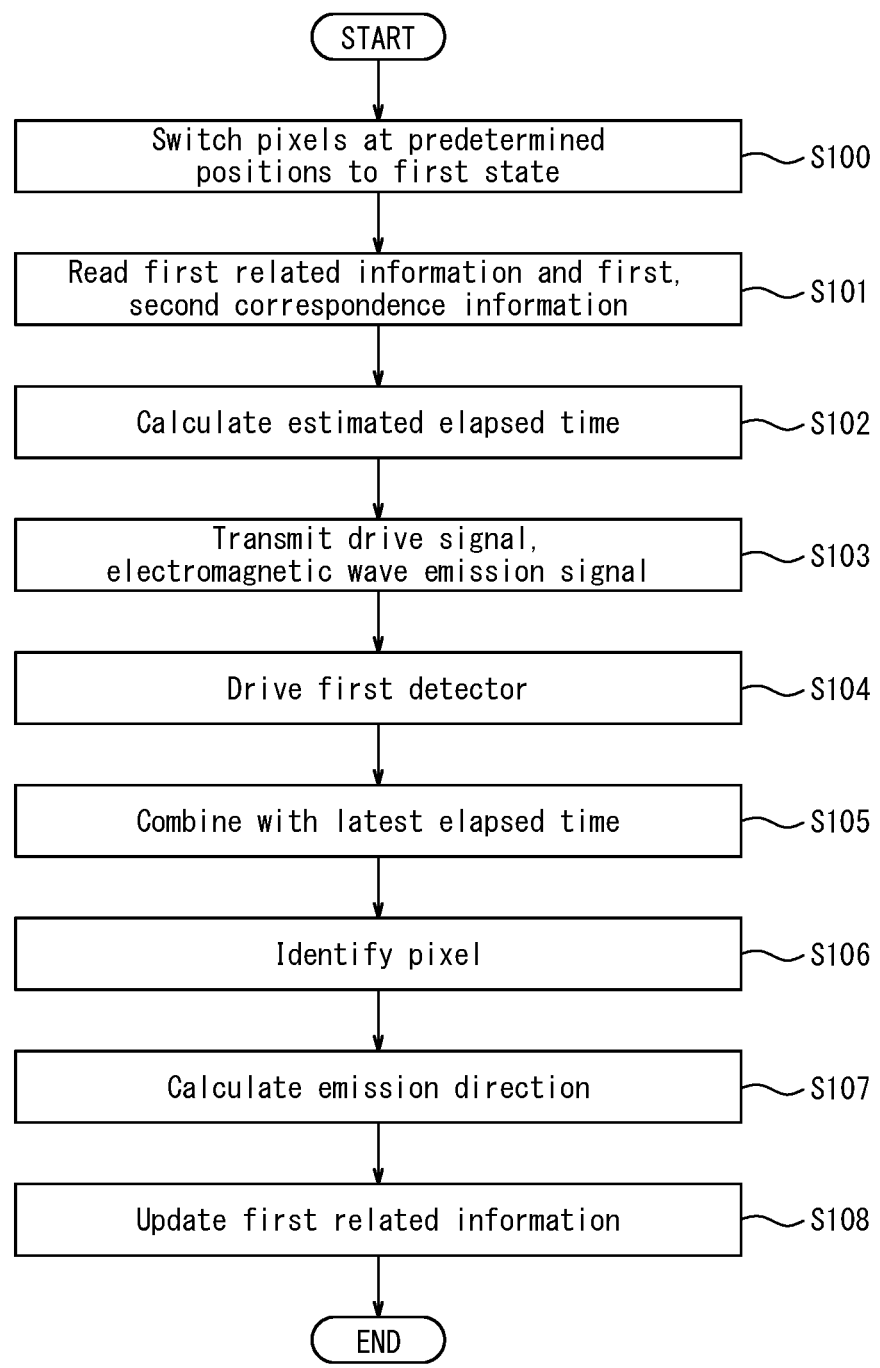
FIG. 16 is a flowchart illustrating processing, executed by the controller of FIG. 1, to update the first related information in the first embodiment.

Next, the processing executed by the controller 14 in the first embodiment to update the first related information is described with reference to the flowchart of FIG. 16. The controller 14 starts the processing to update the first related information when, for example, an input device of the electromagnetic wave detection apparatus 10 detects an operation to execute the processing to update the first related information.

In step S100, the controller 14 switches the pixels px at predetermined positions of the propagation unit 20 to the first state. When the controller 14 has switched the predetermined pixels px to the first state, the process proceeds to step S101.

In step S101, the controller 14 reads the first related information, the first correspondence information, and the second correspondence information from the memory 13. After the controller 14 reads these pieces of information, the process proceeds to step S102.

In step S102, the controller 14 calculates the estimated elapsed time from a reference time until reflected waves reach the predetermined pixel px switched to the first state in step S100. The controller makes this calculation based on the first related information, the first correspondence information, and the second correspondence information read in step S101. After the controller 14 calculates the estimated elapsed time, the process proceeds to step S103.

In step S103, the controller 14 transmits a drive signal, which is a function of the elapsed time, to the propagation direction modifier 16. The controller 14 also transmits an electromagnetic wave emission signal to the irradiation source 15 continuously. After the controller 14 transmits the drive signal and the electromagnetic wave emission signal, the process proceeds to step S104.

In step S104, the controller 14 drives the first detector 17. The controller 14 acquires the actual elapsed time, from the reference time, at which reflected waves are detected by driving of the first detector 17. When the controller 14 acquires the actual elapsed time, the process proceeds to step S105.

In step S105, the controller 14 combines the elapsed time estimated in step S102 with the latest actual elapsed time for each pixel px switched to the first state. After the controller 14 combines the elapsed times, the process proceeds to step S106.

In step S106, the controller 14 identifies the position of the pixel px corresponding to the estimated elapsed time combined with the actual elapsed time in step S105. After the controller 14 identifies the position of the pixel px, the process proceeds to step S107.

In step S107, the controller 14 calculates the emission direction corresponding to the actual elapsed time acquired in step S104 based on the second correspondence information and the first correspondence information read in step S101. After the controller 14 calculates the emission direction, the process proceeds to step S108.

In step S108, the controller 14 uses the combination of the emission direction calculated in step S107 and the position of the pixel px identified in step S106 to update the first related information stored in the memory 13. After updating the first related information, the controller 14 ends the processing to update the first related information.

Figure 17:
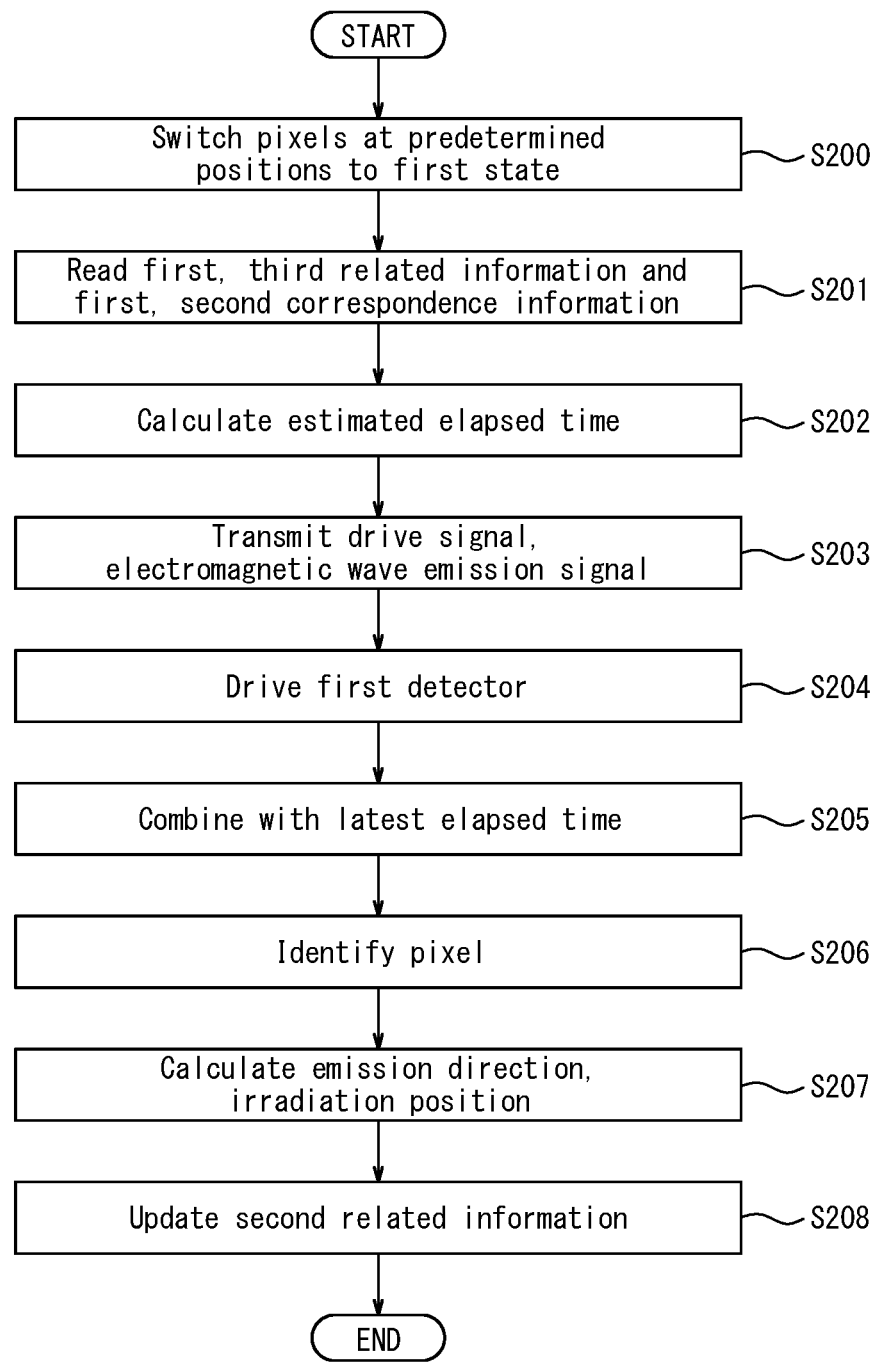
FIG. 17 is a flowchart illustrating processing, executed by the controller of FIG. 1, to update the second related information in the first embodiment.

Next, the processing executed by the controller 14 in the first embodiment to update the second related information is described with reference to the flowchart of FIG. 17. The controller 14 starts the processing to update the second related information when, for example, an input device of the electromagnetic wave detection apparatus 10 detects an operation to execute the processing to update the second related information.

In step S200, the controller 14 switches the pixels px at predetermined positions of the propagation unit 20 to the first state. When the controller 14 has switched the predetermined pixels px to the first state, the process proceeds to step S201.

In step S201, the controller 14 reads the first related information, the third related information, the first correspondence information, and the second correspondence information from the memory 13. After the controller 14 reads these pieces of information, the process proceeds to step S202.

In steps S202 to S206, the controller 14 performs the same control as in steps S102 to S106 of the processing to update the first related information. After the controller 14 distinguishes the position of the pixel px in step S206, the process proceeds to step S207.

In step S207, the controller 14 uses the third related information read in step S201 to calculate the irradiation position corresponding to the position of the pixel px identified in step S206. The controller 14 also calculates the emission direction corresponding to the actual elapsed time acquired in step S204 based on the second correspondence information and the first correspondence information read in step S201. After the controller 14 calculates the irradiation position and the emission direction, the process proceeds to step S208.

In step S208, the controller 14 uses the combination of the emission direction and the irradiation position calculated in step S207 to update the second related information stored in the memory 13. After updating the second related information, the controller 14 ends the processing to update the second related information.

Figure 18:
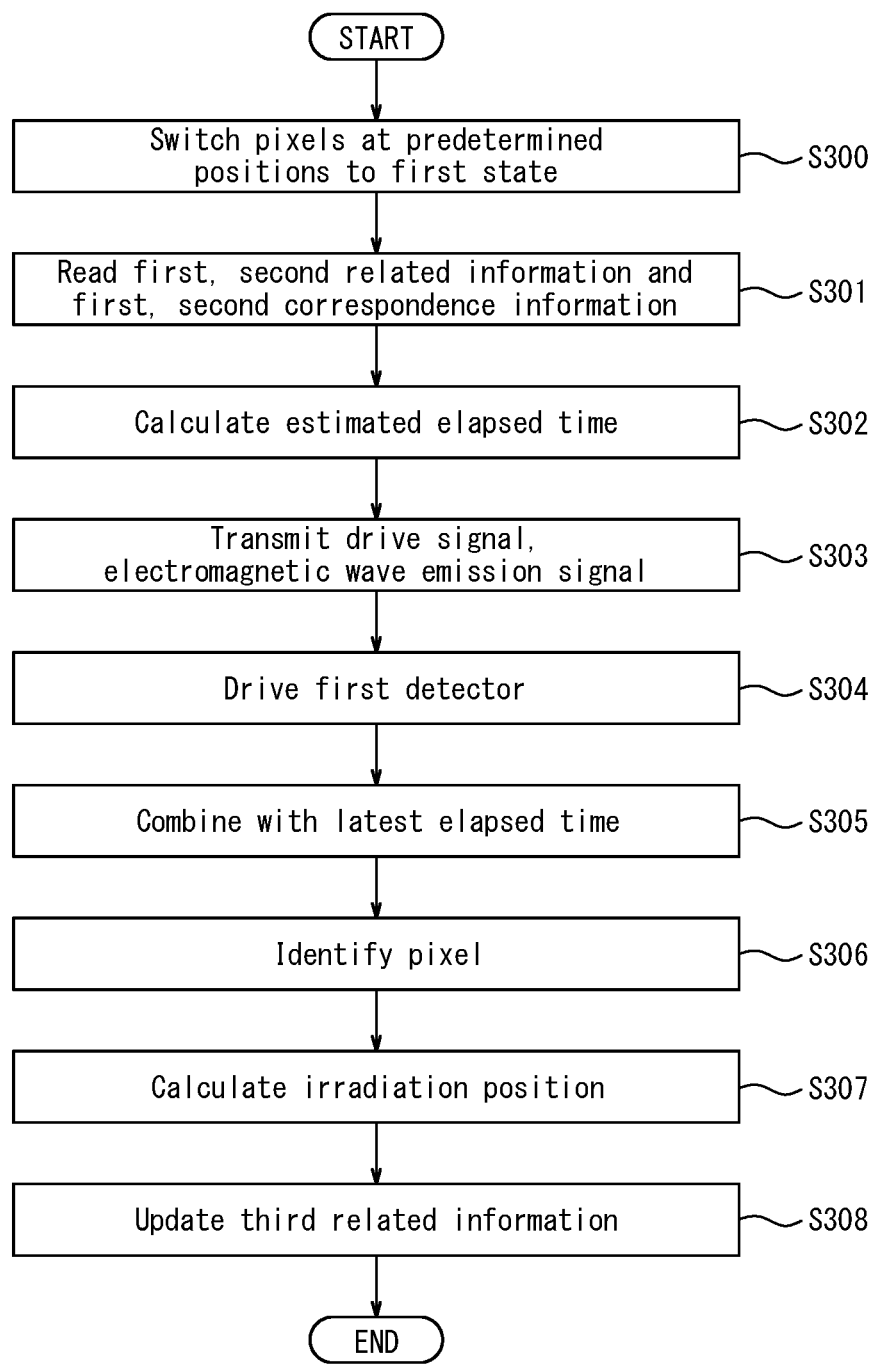
FIG. 18 is a flowchart illustrating processing, executed by the controller of FIG. 1, to update the third related information in the first embodiment.

Next, the processing executed by the controller 14 in the first embodiment to update the third related information is described with reference to the flowchart of FIG. 18. The controller 14 starts the processing to update the third related information when, for example, an input device of the electromagnetic wave detection apparatus 10 detects an operation to execute the processing to update the third related information.

In step S300, the controller 14 switches the pixels px at predetermined positions of the propagation unit 20 to the first state. When the controller 14 has switched the predetermined pixels px to the first state, the process proceeds to step S301.

In step S301, the controller 14 reads the first related information, the second related information, the first correspondence information, and the second correspondence information from the memory 13. After the controller 14 reads these pieces of information, the process proceeds to step S302.

In steps S302 to S306, the controller 14 performs the same control as in steps S102 to S106 of the processing to update the first related information. After the controller 14 distinguishes the position of the pixel px in step S306, the process proceeds to step S307.

In step S307, the controller 14 calculates the irradiation position corresponding to the actual elapsed time acquired in step S304 based on the second correspondence information, the first correspondence information, and the second related information read in step S301. After the controller 14 calculates the irradiation position, the process proceeds to step S308.

In step S308, the controller 14 uses the combination of the irradiation position calculated in step S307 and the position of the pixel px identified in step S306 to update the third related information stored in the memory 13. After updating the third related information, the controller 14 ends the processing to update the third related information.

Figure 19:
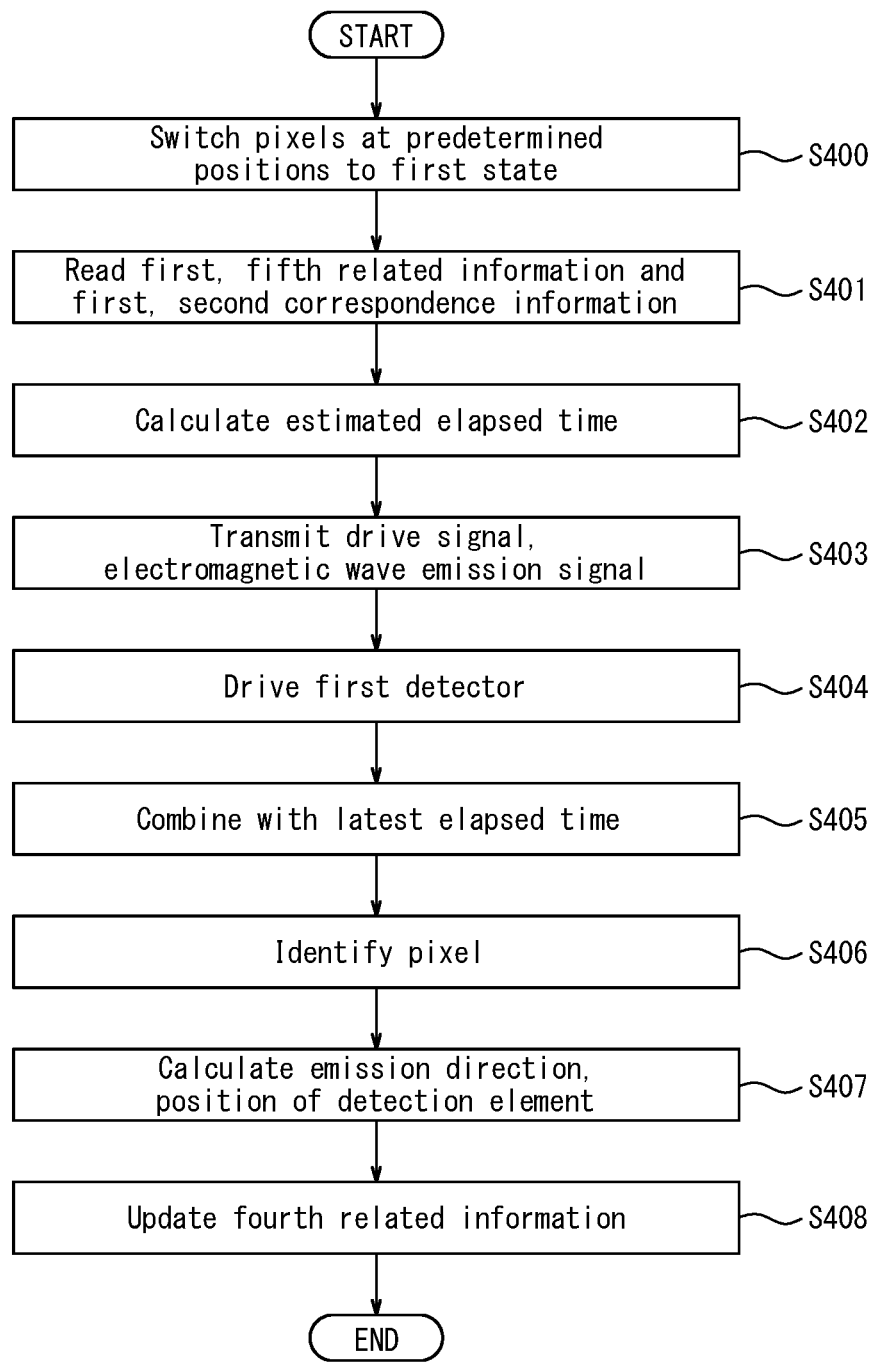
FIG. 19 is a flowchart illustrating processing, executed by the controller of FIG. 1, to update the fourth related information in the first embodiment.

Next, the processing executed by the controller 14 in the first embodiment to update the fourth related information is described with reference to the flowchart of FIG. 19. The controller 14 starts the processing to update the fourth related information when, for example, an input device of the electromagnetic wave detection apparatus 10 detects an operation to execute the processing to update the fourth related information.

In step S400, the controller 14 switches the pixels px at predetermined positions of the propagation unit 20 to the first state. When the controller 14 has switched the predetermined pixels px to the first state, the process proceeds to step S401.

In step S401, the controller 14 reads the first related information, the fifth related information, the first correspondence information, and the second correspondence information from the memory 13. After the controller 14 reads these pieces of information, the process proceeds to step S402.

In steps S402 to S406, the controller 14 performs the same control as in steps S102 to S106 of the processing to update the first related information. After the controller 14 distinguishes the position of the pixel px in step S406, the process proceeds to step S407.

In step S407, the controller 14 uses the fifth related information read in step S401 to calculate the position of the detection element corresponding to the position of the pixel px identified in step S406. The controller 14 also calculates the emission direction corresponding to the actual elapsed time acquired in step S404 based on the second correspondence information and the first correspondence information read in step S401. After the controller 14 calculates the position of the detection element and the emission direction, the process proceeds to step S408.

In step S408, the controller 14 uses the combination of the emission direction and the position of the detection element calculated in step S407 to update the fourth related information stored in the memory 13. After updating the fourth related information, the controller 14 ends the processing to update the fourth related information.

Figure 20:
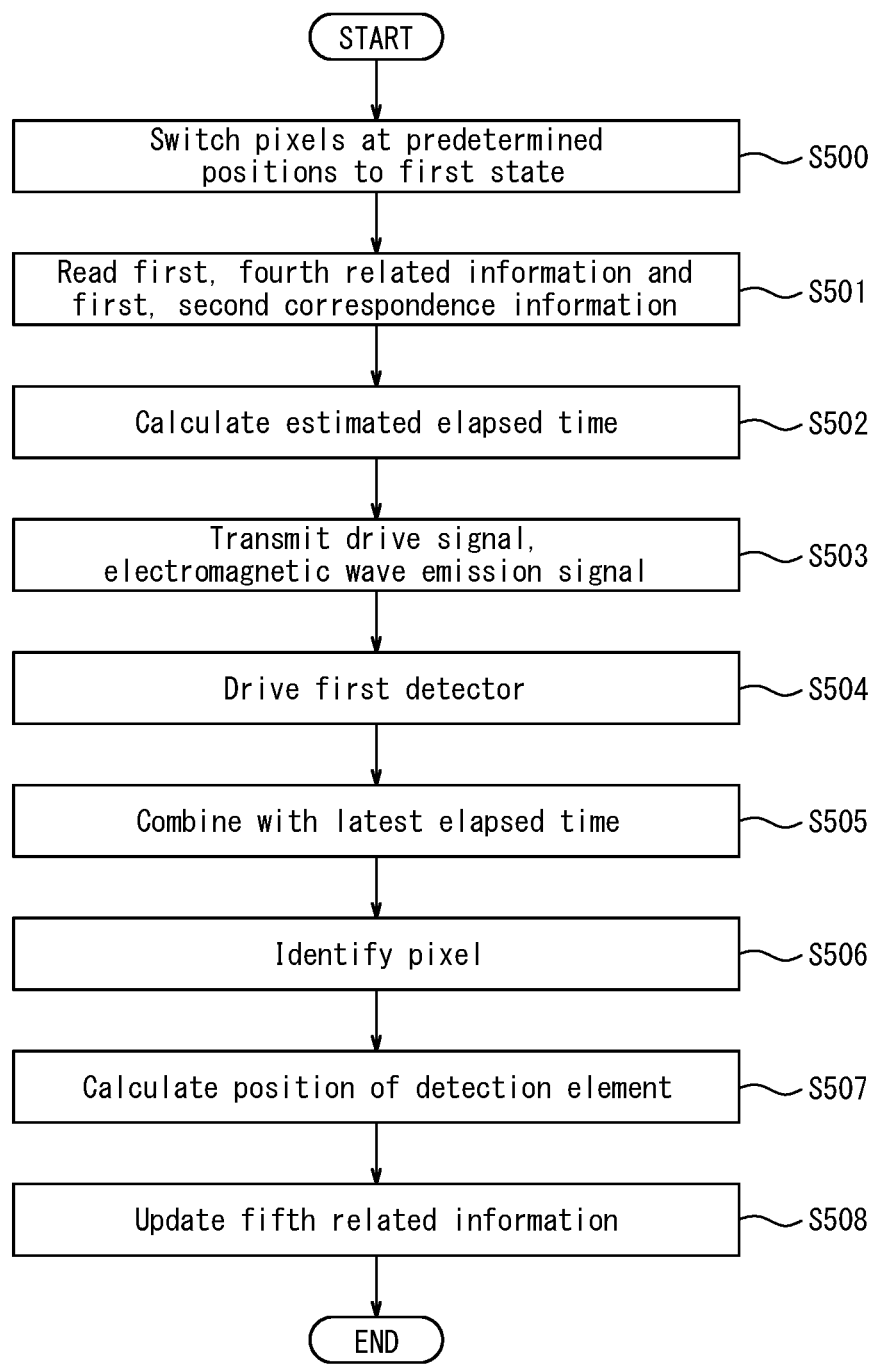
FIG. 20 is a flowchart illustrating processing, executed by the controller of FIG. 1, to update the fifth related information in the first embodiment.

Next, the processing executed by the controller 14 in the first embodiment to update the fifth related information is described with reference to the flowchart of FIG. 20. The controller 14 starts the processing to update the fifth related information when, for example, an input device of the electromagnetic wave detection apparatus 10 detects an operation to execute the processing to update the fifth related information.

In step S500, the controller 14 switches the pixels px at predetermined positions of the propagation unit 20 to the first state. When the controller 14 has switched the predetermined pixels px to the first state, the process proceeds to step S501.

In step S501, the controller 14 reads the first related information, the fourth related information, the first correspondence information, and the second correspondence information from the memory 13. After the controller 14 reads these pieces of information, the process proceeds to step S502.

In steps S502 to S506, the controller 14 performs the same control as in steps S102 to S106 of the processing to update the first related information. After the controller 14 distinguishes the position of the pixel px in step S506, the process proceeds to step S507.

In step S507, the controller 14 calculates the position of the detection element corresponding to the actual elapsed time acquired in step S504 based on the second correspondence information, the first correspondence information, and the fourth related information read in step S501. After the controller 14 calculates the position of the detection element, the process proceeds to step S508.

In step S508, the controller 14 uses the combination of the position of the pixel px identified in step S506 and the position of the detection element calculated in step S507 to update the fifth related information stored in the memory 13. After updating the fifth related information, the controller 14 ends the processing to update the fifth related information.

Figure 21:
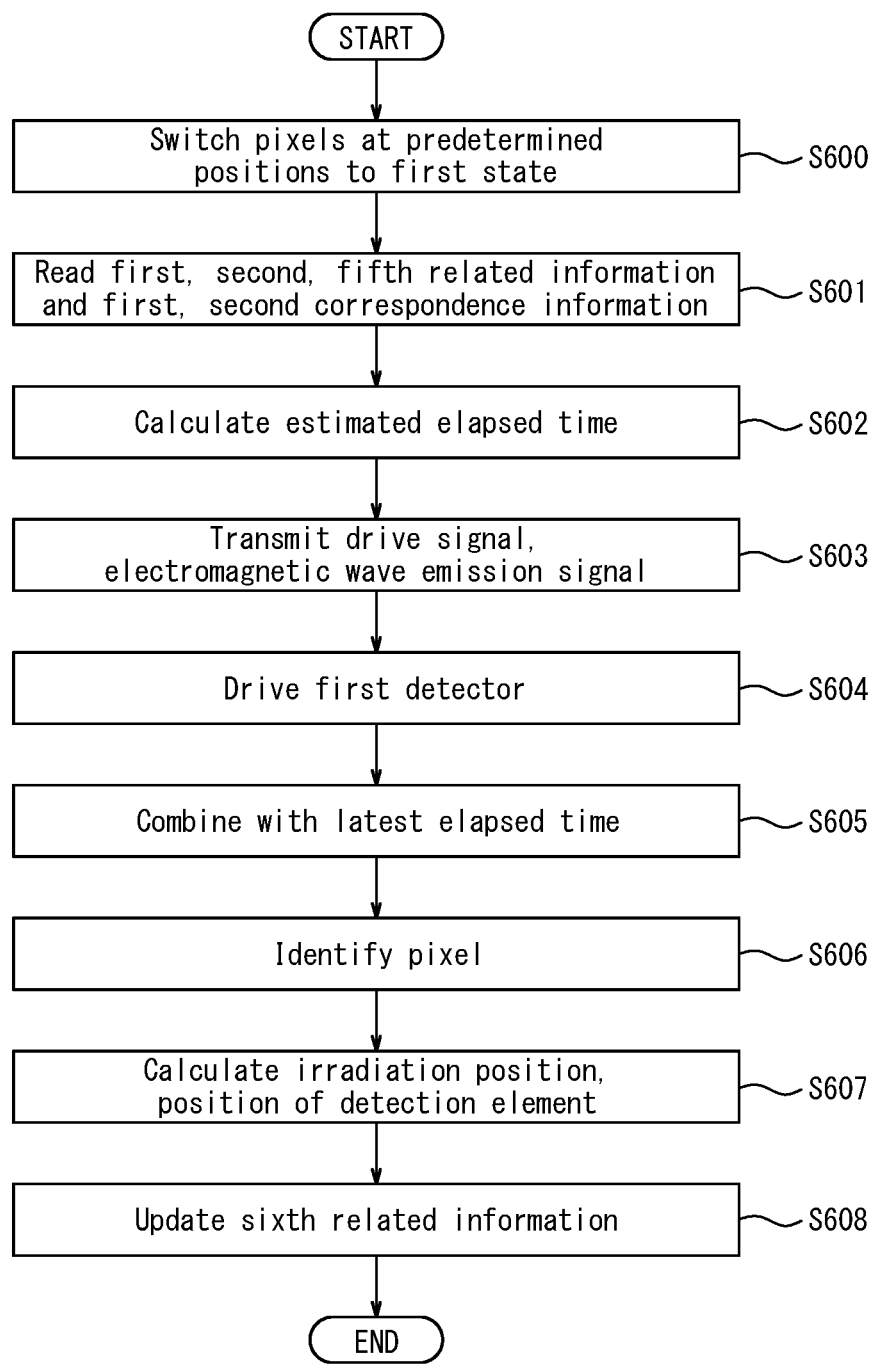
FIG. 21 is a flowchart illustrating processing, executed by the controller of FIG. 1, to update the sixth related information in the first embodiment.

Next, the processing executed by the controller 14 in the first embodiment to update the sixth related information is described with reference to the flowchart of FIG. 21. The controller 14 starts the processing to update the sixth related information when, for example, an input device of the electromagnetic wave detection apparatus 10 detects an operation to execute the processing to update the sixth related information.

In step S600, the controller 14 switches the pixels px at predetermined positions of the propagation unit 20 to the first state. When the controller 14 has switched the predetermined pixels px to the first state, the process proceeds to step S601.

In step S601, the controller 14 reads the first related information, the second related information, the fifth related information, the first correspondence information, and the second correspondence information from the memory 13. After the controller 14 reads these pieces of information, the process proceeds to step S602.

In steps S602 to S606, the controller 14 performs the same control as in steps S102 to S106 of the processing to update the first related information. After the controller 14 distinguishes the position of the pixel px in step S606, the process proceeds to step S607.

In step S607, the controller 14 uses the fifth related information read in step S601 to calculate the position of the detection element corresponding to the position of the pixel px identified in step S606. The controller 14 also calculates the irradiation position corresponding to the actual elapsed time acquired in step S604 based on the second correspondence information, the first correspondence information, and the second related information read in step S601. After the controller 14 calculates the position of the detection element and the emission direction, the process proceeds to step S608.

In step S608, the controller 14 uses the combination of the irradiation position and the position of the detection element calculated in step S607 to update the sixth related information stored in the memory 13. After updating the sixth related information, the controller 14 ends the processing to update the sixth related information.

The electromagnetic wave detection apparatus 10 of the first embodiment with the above configuration updates the related information based on the predetermined position of the pixel px that is propagating reflected waves towards the first detector 17 when the first detector 17 detects the reflected waves. With this configuration, the electromagnetic wave detection apparatus 10 can reduce the difference between i) the estimated correspondence relationship between any two of the emission direction and two elements defining two points on the path of the electromagnetic waves and reflected waves and ii) the actual correspondence relationship. The effects of such a configuration are the same for the electromagnetic wave detection apparatus 10 of the second embodiment, described below.

In particular, based on the combination of the estimated elapsed time and the latest actual elapsed time for each pixel px at a predetermined position, the electromagnetic wave detection apparatus 10 of the first embodiment identifies the predetermined position of the pixel px that is propagating reflected waves towards the first detector 17 when the first detector 17 detects the reflected waves. The electromagnetic wave detection apparatus 10 of the first embodiment with this configuration can use a plurality of pixels px to update the related information during one scan of the propagation unit 20 with reflected waves. Accordingly, in a configuration that uses a plurality of pixels to update the related information, the electromagnetic wave detection apparatus 10 of the first embodiment can shorten the detection time of reflected waves related to all of the pixels px used for updating.

The electromagnetic wave detection apparatus 10 of the first embodiment with the above configuration can switch each pixel px disposed on the action surface as of the propagation unit 20 between the first state and the second state. The electromagnetic wave detection apparatus 10 of the first embodiment with this configuration can align the optical axis of the pre-stage optical system 19 with the optical axis of the first post-stage optical system 21 in the first direction d1, in which electromagnetic waves are propagated in the first state, and with the optical axis of the second post-stage optical system 22 in the second direction d2, in which electromagnetic waves are propagated in the second state. Accordingly, the electromagnetic wave detection apparatus 10 of the first embodiment can reduce the misalignment between the optical axes of the first detector 17 and the second detector 18 by switching the pixels px of the propagation unit 20 between the first state and the second state. The electromagnetic wave detection apparatus 10 of the first embodiment can thereby reduce the misalignment of detection axes in the first detector 17 and the second detector 18. Therefore, the electromagnetic wave detection apparatus 10 of the first embodiment can reduce the misalignment of coordinate systems in the detection results of the first detector 17 and the second detector 18. The effects of such a configuration are the same for the electromagnetic wave detection apparatus 10 of the second embodiment, described below.

The electromagnetic wave detection apparatus 10 of the first embodiment can switch a portion of the pixels px in the propagation unit 20 to the first state and switch another portion of the pixels px to the second state. Accordingly, the electromagnetic wave detection apparatus 10 of the first embodiment can cause the first detector 17 to detect electromagnetic waves at a portion of pixels px while simultaneously causing the second detector 18 to detect electromagnetic waves at another portion of pixels px. The electromagnetic wave detection apparatus 10 of the first embodiment can thereby simultaneously acquire information relating to different regions. The effects of such a configuration are the same for the electromagnetic wave detection apparatus 10 of the second embodiment, described below.

The electromagnetic wave detection apparatus 10 of the first embodiment can switch the same pixel px in the propagation unit 20 to the first state and then to the second state. With this configuration, the first detector 17 can detect electromagnetic waves when the pixel px in the propagation unit 20 is in the first state, and immediately thereafter, the second detector 18 can detect electromagnetic waves when the pixel px is in the second state. The electromagnetic wave detection apparatus 10 of the first embodiment can therefore reduce the misalignment in the timing of electromagnetic wave detection by the first detector 17 and the second detector 18 for the same pixel px in the propagation unit 20. The electromagnetic wave detection apparatus 10 of the first embodiment can thereby reduce misalignment in the timing at which information relating to the same region is acquired. The effects of such a configuration are the same for the electromagnetic wave detection apparatus 10 of the second embodiment, described below.

The electromagnetic wave detection apparatus 10 of the first embodiment includes the irradiation source 15. Accordingly, by irradiating electromagnetic waves onto the object ob, the electromagnetic wave detection apparatus 10 of the first embodiment can cause the first detector 17 to function as an active sensor. The electromagnetic wave detection apparatus 10 of the first embodiment can also cause the second detector 18 to function as a passive sensor. With this configuration, the electromagnetic wave detection apparatus 10 of the first embodiment can switch at least one of the pixels px in the propagation unit 20 from the first state to the second state to cause both an active sensor and a passive sensor to acquire information relating to the same region. Furthermore, with this configuration, the electromagnetic wave detection apparatus 10 of the first embodiment can switch a portion of the pixels px in the propagation unit 20 to the first state and switch another portion of the pixels px to the second state to separate the region in which the active sensor acquires information from the region in which the passive sensor acquires information. The effects of such a configuration are the same for the electromagnetic wave detection apparatus 10 of the second embodiment, described below.

The electromagnetic wave detection apparatus 10 of the first embodiment includes the propagation direction modifier 16. With this configuration, the electromagnetic wave detection apparatus 10 of the first embodiment can scan the object ob using electromagnetic waves emitted by the irradiation source 15. In other words, the electromagnetic wave detection apparatus 10 of the first embodiment can cause the first detector 17 to cooperate with the propagation direction modifier 16 and function as a scanning-type active sensor. Accordingly, the electromagnetic wave detection apparatus 10 of the first embodiment can use the first detector 17 to acquire information in accordance with positions in one or two dimensions. The effects of such a configuration are the same for the electromagnetic wave detection apparatus 10 of the second embodiment, described below.

Next, an electromagnetic wave detection apparatus according to a second embodiment of the present disclosure is described. In the second embodiment, the method of updating the related information differs from the first embodiment. The second embodiment is described below, focusing on the differences from the first embodiment. The same reference signs are used for components with the same configuration as in the first embodiment.

Like the electromagnetic wave detection apparatus 10 of the first embodiment, an electromagnetic wave detection apparatus 10 according to the second embodiment includes an irradiator 11, an electromagnetic wave detector 12, a memory 13, and a controller 14. The configuration and functions of the irradiator 11, the electromagnetic wave detector 12, and the memory 13 in the second embodiment are the same as in the first embodiment. The configuration of the controller 14 in the second embodiment is the same as in the first embodiment. The functions of the controller 14 in the second embodiment other than to update the related information are the same as in the first embodiment. Details of the function, executed by the controller 14 of the second embodiment, to update the related information are described below.

In the second embodiment as well, the controller 14 updates the related information based on the position of the pixel px, in the propagation unit 20, that is propagating the reflected waves towards the first detector 17. Unlike the first embodiment, the controller 14 in the second embodiment switches one pixel px at a predetermined position in the propagation unit 20 to the first state and switches the pixels px at other positions to the second state to update the information related to the emission direction.

As in the first embodiment, the controller 14 in the second embodiment transmits a drive signal, whose signal value is a function of the elapsed time from a reference time, to the propagation direction modifier 16. The controller 14 transmits an electromagnetic wave emission signal to the irradiation source 15 continuously.

As in the first embodiment, the controller 14 in the second embodiment observes the actual elapsed time, from the reference time, at which the first detector 17 detects the reflected waves. As in the first embodiment, the controller 14 in the second embodiment uses the actual elapsed time to calculate, based on the second correspondence information, the drive signal at the time that the first detector 17 detects the reflected waves. As in the first embodiment, the controller 14 in the second embodiment uses the calculated drive signal to calculate the emission direction of the electromagnetic waves based on the first correspondence information.

The control by the controller 14 to update the related information in the second embodiment is the same up to this point for the first related information through the sixth related information. Subsequent control differs for each of the first related information through the sixth related information and is therefore described separately.

Unlike the first embodiment, the controller 14 of the second embodiment updates the first related information by combining the calculated emission direction with the predetermined position of the pixel px and storing the combination in the memory 13. When a plurality of pixels px are used to update the first related information in the second embodiment, then unlike the first embodiment, the controller 14 further switches a single pixel px at a different position to the first state, switches the other pixels px to the second state, and calculates the emission direction corresponding to the single pixel px at the different position.

Unlike the first embodiment, the controller 14 of the second embodiment updates the first related information by combining the different position of the pixel px with the emission direction and storing the combination in the memory 13. Subsequently, the controller 14 performs similar control the same number of times as the number of pixels px used to update the first related information, storing each combination of the emission direction and the position of the pixel px in the memory 13.

The controller 14 of the second embodiment updates the first related information based on the emission direction and the position of the pixel px combined and stored in the memory 13. The method of updating the first related information is the same as in the first embodiment.

To update the second related information, the controller 14 of the second embodiment uses a predetermined position of a pixel px to calculate the irradiation position based on the third related information. Unlike the first embodiment, the controller 14 of the second embodiment further combines the calculated emission direction with the irradiation position and stores the combination in the memory 13.

The controller 14 of the second embodiment updates the second related information in a similar way to the updating of the first related information by switching a single pixel px at a different position to the first state, switching the other pixels px to the second state, and calculating the emission direction and the irradiation position corresponding to the single pixel px at the different position. Unlike the first embodiment, the controller 14 of the second embodiment updates the second related information by combining the emission direction with the irradiation position corresponding to the different position of the pixel px and storing the combination in the memory 13.

To update the second related information, the controller 14 of the second embodiment subsequently performs similar control the same number of times as the number of pixels px used to update the second related information, storing each combination of the emission direction and the irradiation position in the memory 13. Furthermore, the controller 14 updates the second related information based on the emission direction and irradiation position combined and stored in the memory 13. The method of updating the second related information is the same as in the first embodiment.

To update the third related information, the controller 14 of the second embodiment uses the calculated emission direction to calculate the irradiation position based on the second related information. Unlike the first embodiment, the controller 14 of the second embodiment further combines the calculated irradiation position with the predetermined position of the pixel px and stores the combination in the memory 13.

The controller 14 of the second embodiment updates the third related information in a similar way to the updating of the first related information by switching a single pixel px at a different position to the first state, switching the other pixels px to the second state, and calculating the irradiation position corresponding to the single pixel px at the different position. Unlike the first embodiment, the controller 14 of the second embodiment updates the third related information by combining the irradiation position corresponding to the different position of the pixel px with the different position of the pixel px and storing the combination in the memory 13.

To update the third related information, the controller 14 of the second embodiment subsequently performs similar control the same number of times as the number of pixels px used to update the third related information, storing each combination of the irradiation position and the position of the pixel px in the memory 13. Furthermore, the controller 14 updates the third related information based on the irradiation position and the position of the pixel px combined and stored in the memory 13. The method of updating the third related information is the same as in the first embodiment.

To update the fourth related information, the controller 14 of the second embodiment uses a predetermined position of a pixel px to calculate the position of a detection element based on the fifth related information. Unlike the first embodiment, the controller 14 of the second embodiment further combines the calculated emission direction with the position of the detection element and stores the combination in the memory 13.

The controller 14 of the second embodiment updates the fourth related information in a similar way to the updating of the first related information by switching a single pixel px at a different position to the first state, switching the other pixels px to the second state, and calculating the position of the detection element corresponding to the single pixel px at the different position. Unlike the first embodiment, the controller 14 of the second embodiment updates the fourth related information by combining the emission direction with the position of the detection element corresponding to the different position of the pixel px and storing the combination in the memory 13.

To update the fourth related information, the controller 14 of the second embodiment subsequently performs similar control the same number of times as the number of pixels px used to update the fourth related information, storing each combination of the emission direction and the position of the detection element in the memory 13. Furthermore, the controller 14 updates the fourth related information based on the emission direction and position of the detection element combined and stored in the memory 13. The method of updating the fourth related information is the same as in the first embodiment.

To update the fifth related information, the controller 14 of the second embodiment uses the calculated emission direction to calculate the position of the detection element based on the fourth related information. Unlike the first embodiment, the controller 14 of the second embodiment further combines the predetermined position of the pixel px with the position of the detection element and stores the combination in the memory 13.

The controller 14 of the second embodiment updates the fifth related information in a similar way to the updating of the first related information by switching a single pixel px at a different position to the first state, switching the other pixels px to the second state, and calculating the position of the detection element corresponding to the single pixel px at the different position. Unlike the first embodiment, the controller 14 of the second embodiment updates the fifth related information by combining the different position of the pixel px with the position of the detection element and storing the combination in the memory 13.

To update the fifth related information, the controller 14 of the second embodiment subsequently performs similar control the same number of times as the number of pixels px used to update the fifth related information, storing each combination of the position of the pixel px and the position of the detection element in the memory 13. Furthermore, the controller 14 updates the fifth related information based on the position of the pixel px and the position of the detection element combined and stored in the memory 13. The method of updating the fifth related information is the same as in the first embodiment.

To update the sixth related information, the controller 14 of the second embodiment uses a predetermined position of a pixel px to calculate the position of a detection element based on the fifth related information. To update the sixth related information, the controller 14 of the second embodiment uses the calculated emission direction to calculate the irradiation position of the electromagnetic waves based on the second related information. Unlike the first embodiment, the controller 14 of the second embodiment further combines the irradiation position with the position of the detection element and stores the combination in the memory 13.

The controller 14 of the second embodiment updates the sixth related information in a similar way to the updating of the first related information by switching a single pixel px at a different position to the first state, switching the other pixels px to the second state, and calculating the irradiation position and the position of the detection element corresponding to the single pixel px at the different position. Unlike the first embodiment, the controller 14 of the second embodiment updates the sixth related information by combining the irradiation position and the position of the detection element corresponding to the different position of the pixel px and storing the combination in the memory 13.

To update the sixth related information, the controller 14 of the second embodiment subsequently performs similar control the same number of times as the number of pixels px used to update the sixth related information, storing each combination of the irradiation position and the position of the detection element in the memory 13. Furthermore, the controller 14 updates the sixth related information based on the irradiation position and the position of the detection element combined and stored in the memory 13. The method of updating the sixth related information is the same as in the first embodiment.

Figure 22:
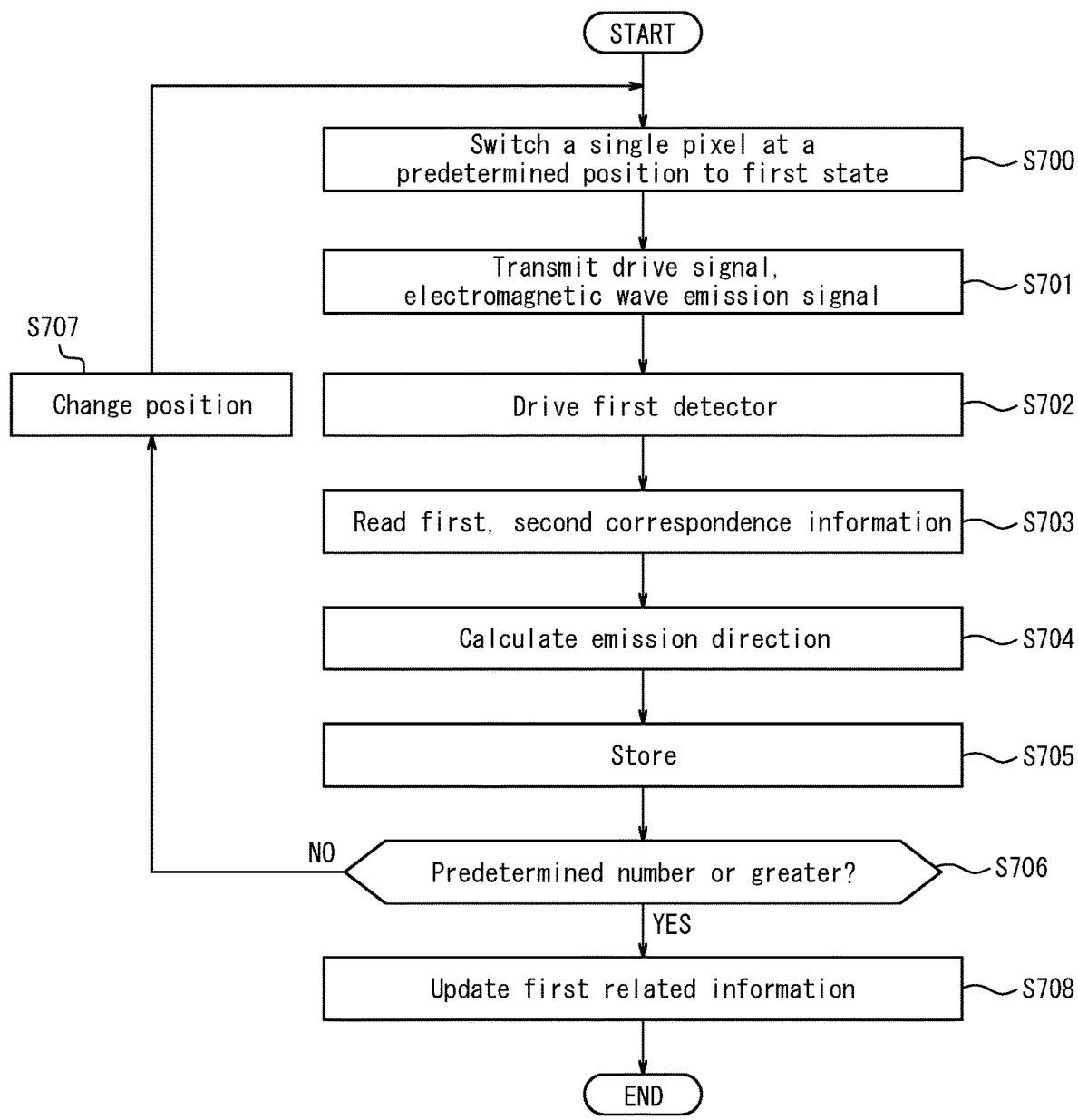
FIG. 22 is a flowchart illustrating processing, executed by the controller of FIG. 1, to update the first related information in a second embodiment.

Next, the processing executed by the controller 14 in the second embodiment to update the first related information is described with reference to the flowchart of FIG. 22. The controller 14 starts the processing to update the first related information when, for example, an input device of the electromagnetic wave detection apparatus 10 detects an operation to execute the processing to update the first related information.

In step S700, the controller 14 switches a single pixel px at a predetermined position of the propagation unit 20 to the first state. When the controller 14 has switched the single pixel px at the predetermined position to the first state, the process proceeds to step S701.

In step S701, the controller 14 transmits a drive signal, which is a function of the elapsed time, to the propagation direction modifier 16. The controller 14 also transmits an electromagnetic wave emission signal to the irradiation source 15 continuously. After the controller 14 transmits the drive signal and the electromagnetic wave emission signal, the process proceeds to step S702.

In step S702, the controller 14 drives the first detector 17. The controller 14 acquires the actual elapsed time, from the reference time, at which reflected waves are detected by driving of the first detector 17. When the controller 14 acquires the actual elapsed time, the process proceeds to step S703.

In step S703, the controller 14 reads the first correspondence information and the second correspondence information from the memory 13. After the controller 14 reads the first correspondence information and the second correspondence information, the process proceeds to step S704.

In step S704, the controller 14 uses the actual elapsed time acquired in step S702 to calculate the emission direction based on the second correspondence information and the first correspondence information read in step S703. After the controller 14 calculates the emission direction, the process proceeds to step S705.

In step S705, the controller 14 combines the emission direction calculated in step S704 with the position of the pixel px switched to the first state in step S700 and stores the combination in the memory 13. After the controller 14 stores the calculated emission direction and the position of the pixel px, the process proceeds to step S706.

In step S706, the controller 14 judges whether the number of combinations stored in step S705 is a predetermined number or greater. When the number of combinations is not the predetermined number or greater, the process proceeds to step S707. When the number of combinations is the predetermined number or greater, the process proceeds to step S708.

In step S707, the controller 14 changes the predetermined position of the pixel px to be changed to the first state to a position that has not yet been changed. When the controller 14 has changed the predetermined position, the process returns to step S700.

In step S708, the controller 14 uses the combination of the emission direction and the position of the pixel px stored in step S705 to update the first related information stored in the memory 13. After updating the first related information, the controller 14 ends the processing to update the first related information.

Figure 23:
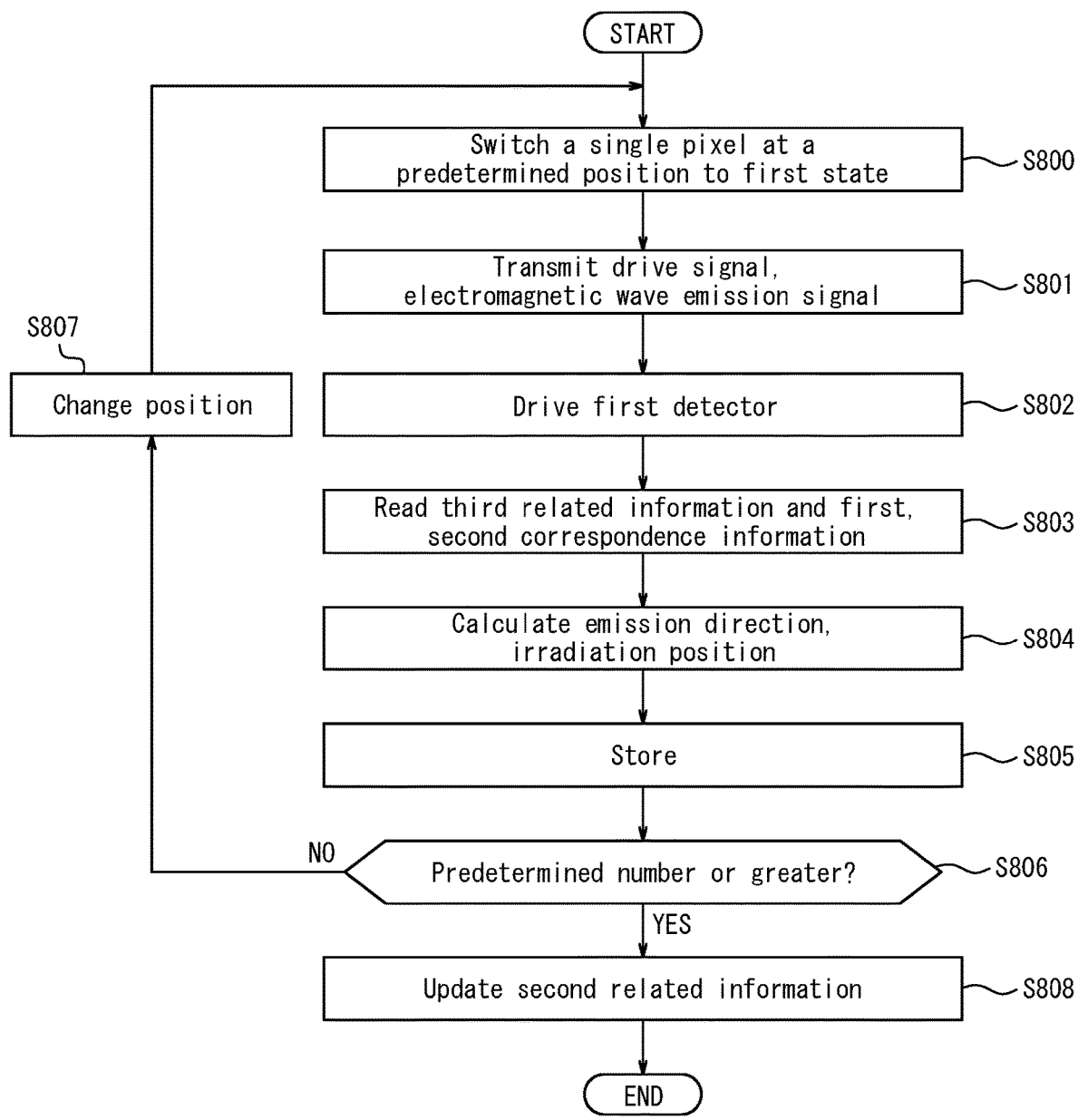
FIG. 23 is a flowchart illustrating processing, executed by the controller of FIG. 1, to update the second related information in the second embodiment.

Next, the processing executed by the controller 14 in the second embodiment to update the second related information is described with reference to the flowchart of FIG. 23. The controller 14 starts the processing to update the second related information when, for example, an input device of the electromagnetic wave detection apparatus 10 detects an operation to execute the processing to update the second related information.

In steps S800 to S802, the controller 14 performs the same control as in steps S700 to S702 of the processing to update the first related information. When the controller 14 acquires the actual elapsed time in step S802, the process proceeds to step S803.

In step S803, the controller 14 reads the first related information, the first correspondence information, and the second correspondence information from the memory 13. After the controller 14 reads the first related information, the first correspondence information, and the second correspondence information, the process proceeds to step S804.

In step S804, the controller 14 uses the actual elapsed time acquired in step S802 to calculate the emission direction based on the second correspondence information and the first correspondence information read in step S803. The controller 14 also uses the position of the pixel px switched to the first state in step S800 to calculate the irradiation position based on the third related information read in step S803. After the controller 14 calculates the emission direction and the irradiation position, the process proceeds to step S805.

In step S805, the controller 14 combines the emission direction and irradiation position calculated in step S804 and stores the combination in the memory 13. After the controller 14 stores the calculated emission direction and irradiation position, the process proceeds to step S806.

In steps S806 and S807, the controller 14 performs the same control as in steps S706 and S707 of the processing to update the first related information. When the number of combinations is the predetermined number or more in step S806, the process proceeds to step S808.

In step S808, the controller 14 uses the combination of the emission direction and the irradiation position stored in step S805 to update the second related information stored in the memory 13. After updating the second related information, the controller 14 ends the processing to update the second related information.

Figure 24:
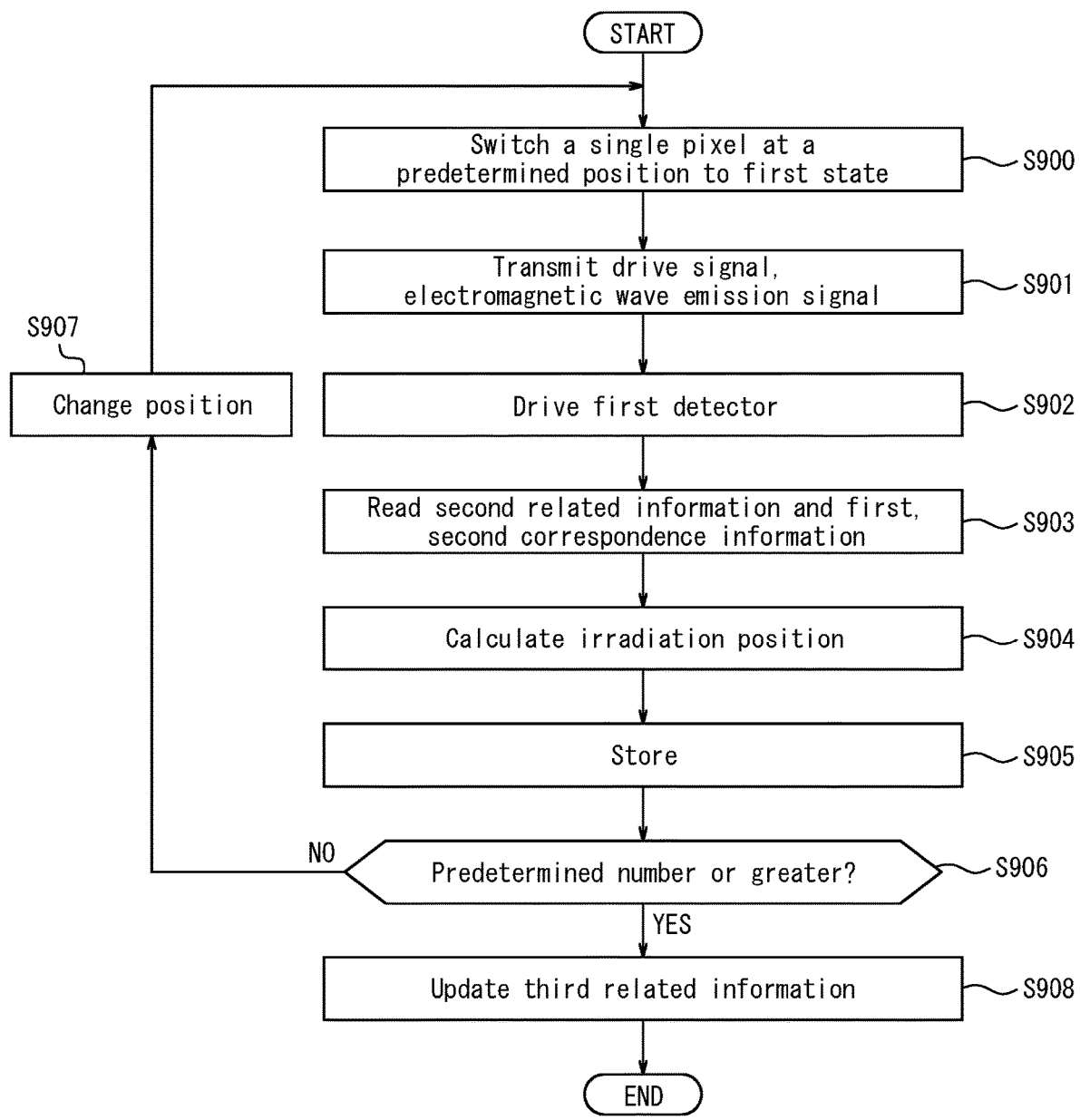
FIG. 24 is a flowchart illustrating processing, executed by the controller of FIG. 1, to update the third related information in the second embodiment.

Next, the processing executed by the controller 14 in the second embodiment to update the third related information is described with reference to the flowchart of FIG. 24. The controller 14 starts the processing to update the third related information when, for example, an input device of the electromagnetic wave detection apparatus 10 detects an operation to execute the processing to update the third related information.

In steps S900 to S902, the controller 14 performs the same control as in steps S700 to S702 of the processing to update the first related information. When the controller 14 acquires the actual elapsed time in step S902, the process proceeds to step S903.

In step S903, the controller 14 reads the second related information, the first correspondence information, and the second correspondence information from the memory 13. After the controller 14 reads the second related information, the first correspondence information, and the second correspondence information, the process proceeds to step S904.

In step S904, the controller 14 uses the actual elapsed time acquired in step S902 to calculate the irradiation position based on the second correspondence information, the first correspondence information, and the second related information read in step S903. After the controller 14 calculates the irradiation position, the process proceeds to step S905.

In step S905, the controller 14 combines the irradiation position calculated in step S904 with the position of the pixel px switched to the first state in step S900 and stores the combination in the memory 13. After the controller 14 stores the irradiation position and the position of the pixel px, the process proceeds to step S906.

In steps S906 and S907, the controller 14 performs the same control as in steps S706 and S707 of the processing to update the first related information. When the number of combinations is the predetermined number or more in step S906, the process proceeds to step S908.

In step S908, the controller 14 uses the combination of the irradiation position and the position of the pixel px stored in step S905 to update the third related information stored in the memory 13. After updating the third related information, the controller 14 ends the processing to update the third related information.

Figure 25:
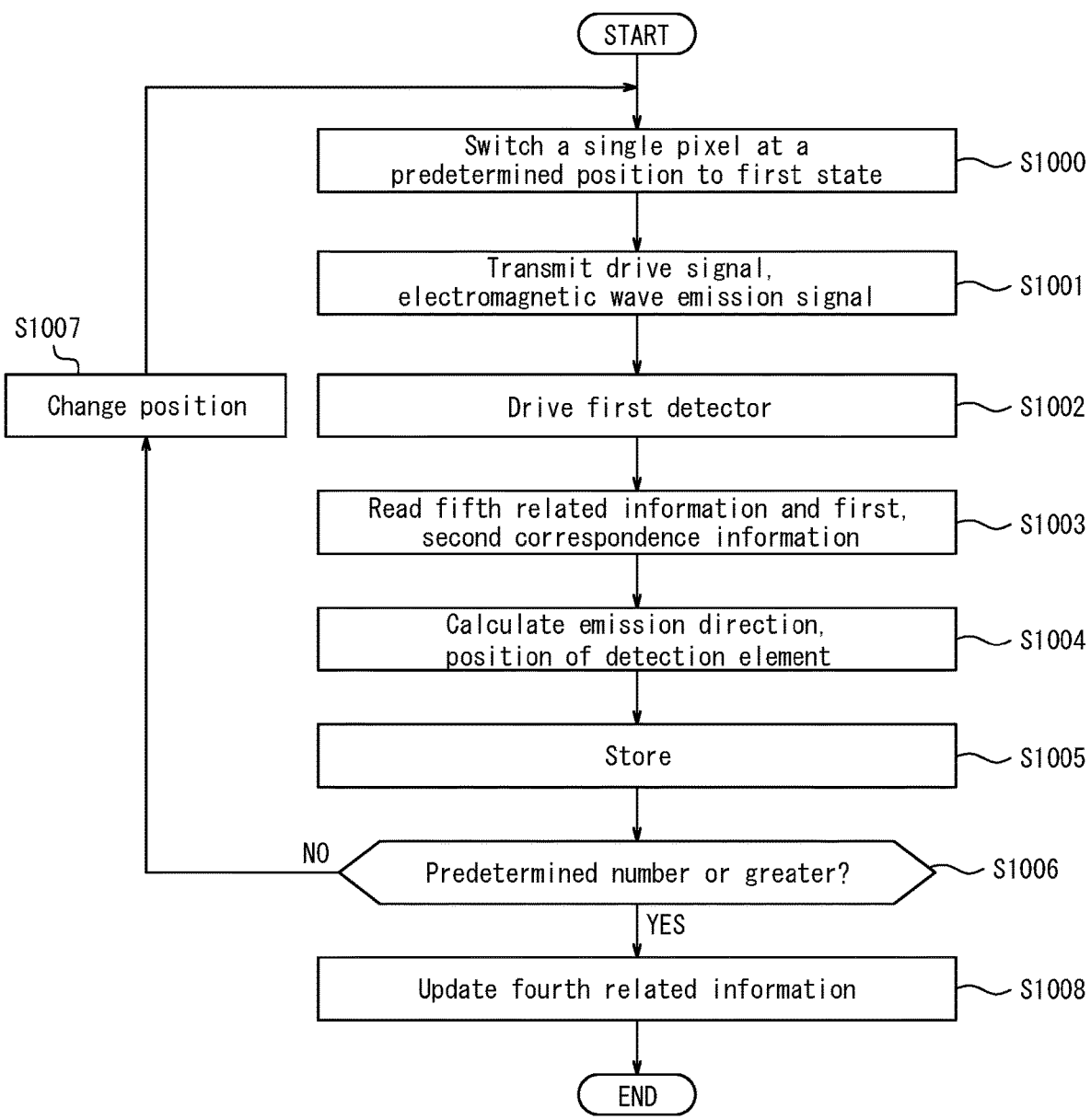
FIG. 25 is a flowchart illustrating processing, executed by the controller of FIG. 1, to update the fourth related information in the second embodiment.

Next, the processing executed by the controller 14 in the second embodiment to update the fourth related information is described with reference to the flowchart of FIG. 25. The controller 14 starts the processing to update the fourth related information when, for example, an input device of the electromagnetic wave detection apparatus 10 detects an operation to execute the processing to update the fourth related information.

In steps S1000 to S1002, the controller 14 performs the same control as in steps S700 to S702 of the processing to update the first related information. When the controller 14 acquires the actual elapsed time in step S1002, the process proceeds to step S1003.

In step S1003, the controller 14 reads the fifth related information, the first correspondence information, and the second correspondence information from the memory 13. After the controller 14 reads the fifth related information, the first correspondence information, and the second correspondence information, the process proceeds to step S1004.

In step S1004, the controller 14 uses the actual elapsed time acquired in step S1002 to calculate the emission direction based on the second correspondence information and the first correspondence information read in step S1003. The controller 14 also uses the position of the pixel px switched to the first state in step S1000 to calculate the position of the detection element based on the fifth related information read in step S1003. After the controller 14 calculates the emission direction and the position of the detection element, the process proceeds to step S1005.

In step S1005, the controller 14 combines the emission direction and position of the detection element calculated in step S1004 and stores the combination in the memory 13. After the controller 14 stores the emission direction and the position of the detection element, the process proceeds to step S1006.

In steps S1006 and S1007, the controller 14 performs the same control as in steps S706 and S707 of the processing to update the first related information. When the number of combinations is the predetermined number or more in step S1006, the process proceeds to step S1008.

In step S1008, the controller 14 uses the combination of the emission direction and the position of the detection element stored in step S1005 to update the fourth related information stored in the memory 13. After updating the fourth related information, the controller 14 ends the processing to update the fourth related information.

Figure 26:
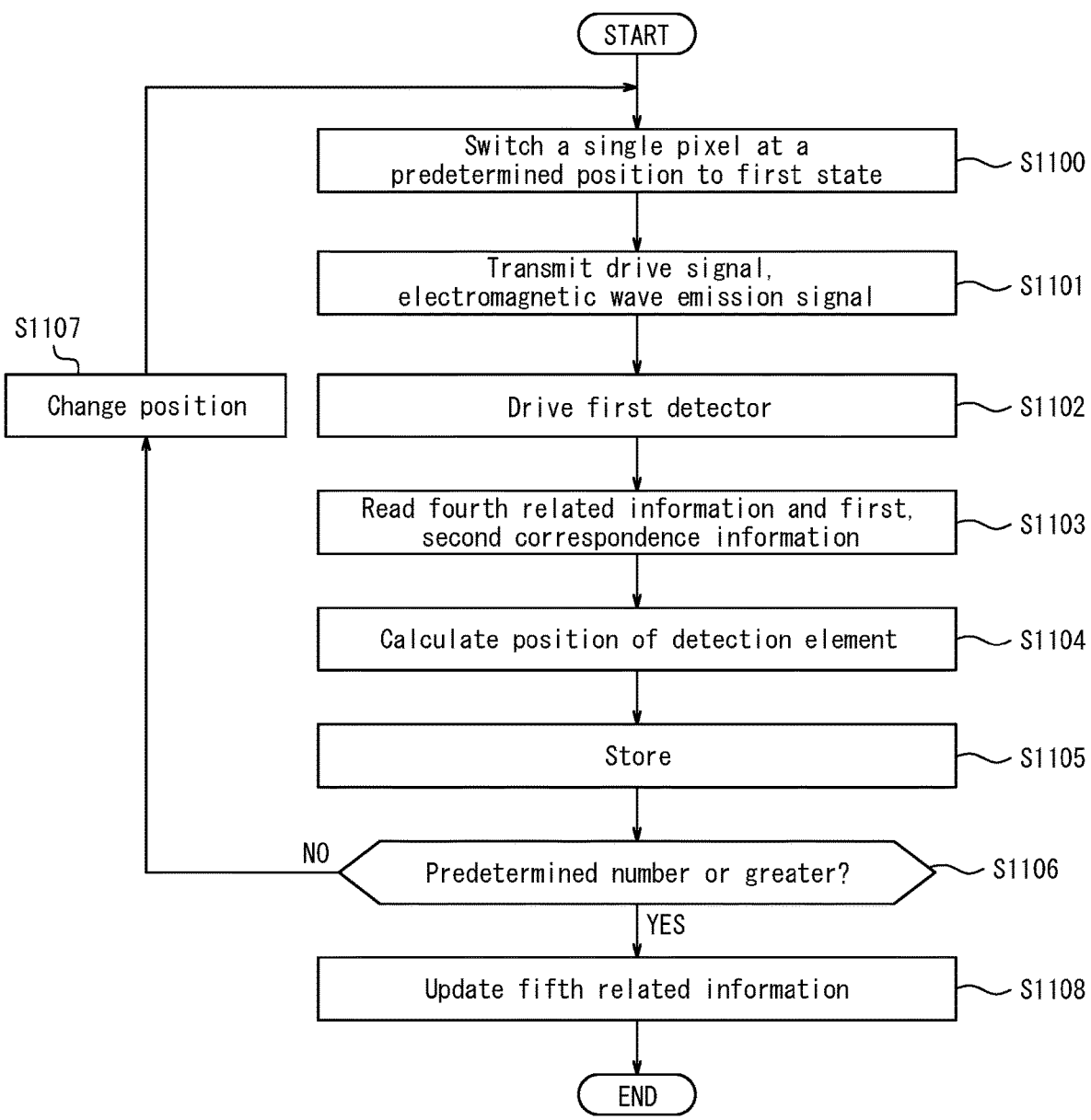
FIG. 26 is a flowchart illustrating processing, executed by the controller of FIG. 1, to update the fifth related information in the second embodiment.

Next, the processing executed by the controller 14 in the second embodiment to update the fifth related information is described with reference to the flowchart of FIG. 26. The controller 14 starts the processing to update the fifth related information when, for example, an input device of the electromagnetic wave detection apparatus 10 detects an operation to execute the processing to update the fifth related information.

In steps S1100 to S1102, the controller 14 performs the same control as in steps S700 to S702 of the processing to update the first related information. When the controller 14 acquires the actual elapsed time in step S1102, the process proceeds to step S1103.

In step S1103, the controller 14 reads the fourth related information, the first correspondence information, and the second correspondence information from the memory 13. After the controller 14 reads the fourth related information, the first correspondence information, and the second correspondence information, the process proceeds to step S1104.

In step S1104, the controller 14 uses the actual elapsed time acquired in step S1102 to calculate the position of the detection element based on the second correspondence information, the first correspondence information, and the fourth related information read in step S1103. After the controller 14 calculates the position of the detection element, the process proceeds to step S1105.

In step S1105, the controller 14 combines the position of the pixel px switched to the first state in step S1100 with the position of the detection element calculated in step S1104 and stores the combination in the memory 13. After the controller 14 stores the position of the pixel px and the position of the detection element, the process proceeds to step S1106.

In steps S1106 and S1107, the controller 14 performs the same control as in steps S706 and S707 of the processing to update the first related information. When the number of combinations is the predetermined number or more in step S1106, the process proceeds to step S1108.

In step S1108, the controller 14 uses the combination of the position of the pixel px and the position of the detection element stored in step S1105 to update the fifth related information stored in the memory 13. After updating the fifth related information, the controller 14 ends the processing to update the fifth related information.

Next, the processing executed by the controller 14 in the second embodiment to update the sixth related information is described with reference to the flowchart of FIG. 27. The controller 14 starts the processing to update the sixth related information when, for example, an input device of the electromagnetic wave detection apparatus 10 detects an operation to execute the processing to update the sixth related information.

In steps S1200 to S1202, the controller 14 performs the same control as in steps S700 to S702 of the processing to update the first related information. When the controller 14 acquires the actual elapsed time in step S1202, the process proceeds to step S1203.

In step S1203, the controller 14 reads the second related information, the fifth related information, the first correspondence information, and the second correspondence information from the memory 13. After the controller 14 reads the second related information, the fifth correspondence information, the first correspondence information, and the second correspondence information, the process proceeds to step S1204.

In step S1204, the controller 14 uses the actual elapsed time acquired in step S1202 to calculate the irradiation position based on the second correspondence information, the first correspondence information, and the second related information read in step S1203. The controller 14 also uses the position of the pixel px switched to the first state in step S1200 to calculate the position of the detection element based on the fifth related information. After the controller 14 calculates the irradiation position and the position of the detection element, the process proceeds to step S1205.

In step S1205, the controller 14 combines the irradiation position and position of the detection element calculated in step S1204 and stores the combination in the memory 13. After the controller 14 stores the irradiation position and the position of the detection element, the process proceeds to step S1206.

In steps S2106 and S1207, the controller 14 performs the same control as in steps S706 and S707 of the processing to update the first related information. When the number of combinations is the predetermined number or more in step S1206, the process proceeds to step S1208.

In step S1208, the controller 14 uses the combination of the irradiation position and the position of the detection element stored in step S1205 to update the sixth related information stored in the memory 13. After updating the sixth related information, the controller 14 ends the processing to update the sixth related information.

The electromagnetic wave detection apparatus 10 of the second embodiment with this configuration switches a single pixel px to the first direction d1 during one scan of the propagation unit 20 by reflected waves. Even when the difference between the estimated correspondence relationship and the actual correspondence relationship is relatively large, this configuration allows the electromagnetic wave detection apparatus 10 of the second embodiment to accurately combine the drive signal with the position of the pixel px that propagates reflected waves towards the first detector 17 when the reflected waves are detected. Accordingly, the electromagnetic wave detection apparatus 10 of the second embodiment can very accurately reduce the difference between the estimated correspondence relationship and the actual correspondence relationship even when this difference is relatively large.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

In the first and second embodiments, the propagation unit 20 can switch the travel direction of the electromagnetic waves incident on the action surface as between two directions, i.e. the first direction d1 and the second direction d2, but the propagation unit 20 may instead be capable of switching the travel direction among three or more directions.

In the first and second embodiments, the first state of the propagation unit 20 is a first reflecting state for reflecting the electromagnetic waves incident on the action surface as in the first direction d1, and the second state of the propagation unit 20 is a second reflecting state for reflecting these electromagnetic waves in the second direction d2. This configuration is not, however, limiting.

For example, the second state may be a transmitting state for transmitting the electromagnetic waves incident on the action surface as for the electromagnetic waves to propagate in the second direction d2. In greater detail, the propagation unit 20 may include a shutter, on each pixel px, that has a reflecting surface that reflects electromagnetic waves. The propagation unit 20 with this configuration can open and close the shutter of each pixel px to switch each pixel px between the first reflecting state and the transmitting state that is the second state. An example of the propagation unit 20 with such a configuration is a propagation unit that includes a MEMS shutter including a plurality of openable shutters arranged in an array. Another example of the propagation unit 20 is a propagation unit that includes a liquid crystal shutter capable of switching, in accordance with liquid crystal orientation, between the reflecting state for reflecting electromagnetic waves and the transmitting state for transmitting electromagnetic waves. The propagation unit 20 with this configuration can switch each pixel px between the reflecting state as the first state and the transmitting state as the second state by switching the liquid crystal orientation of each pixel px.

In the electromagnetic wave detection apparatus 10 of the first and second embodiments, the first detector 17 functions as a portion of an active sensor, and the second detector 18 is a passive sensor. The electromagnetic wave detection apparatus 10 is not, however, limited to this configuration. For example, the electromagnetic wave detection apparatus 10 can achieve similar effects as in the first embodiment when the first detector 17 and the second detector 18 are both passive sensors and when both function as a portion of an active sensor.

In the first and second embodiments, the electromagnetic wave detection apparatus 10 is configured to include the irradiation source 15, the propagation direction modifier 16, the memory 13, the controller 14, and the electromagnetic wave detector 12, but the electromagnetic wave detection apparatus 10 may be configured to include at least one of these components. An electromagnetic wave detection system may be configured so that the electromagnetic wave detection apparatus 10 includes at least the electromagnetic wave detector 12, with another apparatus including the other components.

In the first and second embodiments, the electromagnetic wave detection apparatus 10 is configured so that the propagation direction modifier 16 scans the beam of electromagnetic waves emitted by the irradiation source 15, thereby causing the first detector 17 to cooperate with the propagation direction modifier 16 and function as a scanning-type active sensor. The electromagnetic wave detection apparatus 10 is not, however, limited to this configuration. For example, the electromagnetic wave detection apparatus 10 can achieve similar effects as in the first and second embodiments, without including the propagation direction modifier 16, by causing electromagnetic waves to be emitted radially from the irradiation source 15 and by acquiring information without scanning.

In the present embodiment, the electromagnetic wave detection apparatus 10 can update the first related information through the sixth related information, but it suffices for the electromagnetic wave detection apparatus 10 to be capable of updating at least one of the first related information through the sixth related information.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

A machine-readable, non-transitory storage medium may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic and optical storage media (such as a compact disk (CD), laser Disc® (laser disc is a registered trademark in Japan, other countries, or both), digital versatile disc (DVD), floppy disk, and Blu-ray Disc), portable computer disk, random access memory (RAM), read-only memory (ROM), rewritable programmable ROM such as EPROM, EEPROM, or flash memory, another tangible storage medium that can store information, or a combination of any of these. The memory may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

REFERENCE SIGNS LIST

10 Electromagnetic wave detection apparatus
11 Irradiator
12 Electromagnetic wave detector
13 Memory
14 Controller
15 Irradiation source
16 Propagation direction modifier
17 First detector
18 Second detector
19 Pre-stage optical system
20 Propagation unit
21 First post-stage optical system
22 Second post-stage optical system
as Action surface
d1 First direction
d2 Second direction
ob Object
px, px1, px2 Pixel

The invention claimed is:
1. An electromagnetic wave detection apparatus comprising:
an irradiator configured to emit electromagnetic waves;
a first detector configured to detect reflected waves of the electromagnetic waves irradiated onto an object;
a propagation unit comprising a plurality of propagation elements that, by irradiation position of the electromagnetic waves irradiated onto the object, switch between propagating and not propagating the reflected waves of the electromagnetic waves towards the first detector;
a memory configured to store related information associating an emission direction of the electromagnetic waves from the irradiator and two elements defining two points on a path of the electromagnetic waves emitted from the irradiator to at least the propagation unit via the object; and
a controller configured to update the related information based on a position of a propagation element that is propagating the reflected waves towards the first detector when the first detector detects the reflected waves.

2. The electromagnetic wave detection apparatus of claim 1,
wherein the related information comprises first related information associating the emission direction and a position of the propagation element on which the reflected waves of the electromagnetic waves emitted in the emission direction are incident; and
wherein the controller is configured to update the related information by updating the first related information based on the position of the propagation element that is propagating the reflected waves towards the first detector when the first detector detects the reflected waves and the emission direction when the first detector detects the reflected waves.

3. The electromagnetic wave detection apparatus of claim 1,
wherein the related information comprises second related information associating the emission direction and the irradiation position of the electromagnetic waves emitted in the emission direction; and
wherein the controller is configured to update the related information by updating the second related information based on the position of the propagation element that is propagating the reflected waves towards the first detector when the first detector detects the reflected waves and the emission direction when the first detector detects the reflected waves.

4. The electromagnetic wave detection apparatus of claim 1,
wherein the related information comprises third related information associating the irradiation position and a position of the propagation element on which the reflected waves of the electromagnetic waves irradiated onto the irradiation position are incident; and
wherein the controller is configured to update the related information by updating the third related information based on the position of the propagation element that is propagating the reflected waves towards the first detector when the first detector detects the reflected waves and the emission direction when the first detector detects the reflected waves.

5. The electromagnetic wave detection apparatus of claim 1, further comprising:
a second detector disposed in a second direction different from a first direction in which the first detector is disposed relative to the propagation unit, the second detector comprising a plurality of detection elements configured to detect the reflected waves by irradiation position;
wherein the related information associates any two of an emission direction of the electromagnetic waves from the irradiator and two elements defining two points on a path of the electromagnetic waves emitted from the irradiator to the second detector via the object.

6. The electromagnetic wave detection apparatus of claim 5,
wherein the related information comprises fourth related information associating the emission direction and the position of the detection element that detects the reflected waves of the electromagnetic waves emitted in the emission direction; and
wherein the controller is configured to update the related information by updating the fourth related information based on the position of the propagation element that is propagating the reflected waves towards the first detector when the first detector detects the reflected waves and the emission direction when the first detector detects the reflected waves.

7. The electromagnetic wave detection apparatus of claim 5,
wherein the related information comprises fifth related information associating a position of the propagation element and a position of the detection element towards which the propagation element propagates the reflected waves; and
wherein the controller is configured to update the related information by updating the fifth related information based on the position of the propagation element that is propagating the reflected waves towards the first detector when the first detector detects the reflected waves and the emission direction when the first detector detects the reflected waves.

8. The electromagnetic wave detection apparatus of claim 5,
wherein the related information comprises sixth related information associating the irradiation position and the position of the detection element that detects the reflected waves of the electromagnetic waves irradiated onto the irradiation position; and
wherein the controller is configured to update the related information by updating the sixth related information based on the position of the propagation element that is propagating the reflected waves towards the first detector when the first detector detects the reflected waves and the emission direction when the first detector detects the reflected waves.

9. The electromagnetic wave detection apparatus of claim 5, wherein the propagation unit is configured to switch each propagation element between a first state of propagating the reflected waves of the electromagnetic waves in the first direction and a second state of propagating the reflected waves of the electromagnetic waves in the second direction.

10. A non-transitory computer-readable recording medium that stores a control program for causing an apparatus to execute processes comprising:
emitting electromagnetic waves from an irradiator;
detecting, using a first detector, reflected waves of the electromagnetic waves irradiated onto an object;
causing a portion of a plurality of propagation elements to propagate the reflected waves of the electromagnetic waves irradiated onto the object towards the first detector, the plurality of propagation elements being included in a propagation unit and configured to switch between propagating and not propagating the reflected waves of the electromagnetic waves towards the first detector by irradiation position of the electromagnetic waves;
storing related information associating an emission direction of the electromagnetic waves from the irradiator and two elements defining two points on a path of the electromagnetic waves emitted from the irradiator to at least the propagation unit via the object; and
updating the information related to the emission direction based on a position of a propagation element that is propagating the reflected waves towards the first detector when the first detector detects the reflected waves.

11. An electromagnetic wave detection system comprising:
an irradiator configured to emit electromagnetic waves;
a first detector configured to detect reflected waves of the electromagnetic waves irradiated onto an object;
a propagation unit comprising a plurality of propagation elements that, by irradiation position of the electromagnetic waves irradiated onto the object, switch between propagating and not propagating the reflected waves of the electromagnetic waves towards the first detector;

a memory configured to store related information associating an emission direction of the electromagnetic waves from the irradiator and two elements defining two points on a path of the electromagnetic waves emitted from the irradiator to at least the propagation unit via the object; and a controller configured to update the related information based on a position of a propagation element that is propagating the reflected waves towards the first detector when the first detector detects the reflected waves.

* * * * *